US009513486B2

(12) United States Patent
Otsubo

(10) Patent No.: US 9,513,486 B2
(45) Date of Patent: Dec. 6, 2016

(54) OPTICAL IMAGING APPARATUS

(75) Inventor: Makoto Otsubo, Hiroshima (JP)

(73) Assignee: ASUKANET COMPANY, LTD., Hiroshima-shi (JP)

(\*) Notice: Subject to any disclaimer, the term of this patent is extended or adjusted under 35 U.S.C. 154(b) by 109 days.

(21) Appl. No.: 14/352,616

(22) PCT Filed: Jan. 19, 2012

(86) PCT No.: PCT/JP2012/051087
§ 371 (c)(1),
(2), (4) Date: Apr. 17, 2014

(87) PCT Pub. No.: WO2013/061619
PCT Pub. Date: May 2, 2013

(65) Prior Publication Data
US 2014/0254009 A1     Sep. 11, 2014

(30) Foreign Application Priority Data

Oct. 24, 2011  (JP) ................................. 2011-233166

(51) Int. Cl.
G02B 27/22     (2006.01)
G02B 17/00     (2006.01)
G03B 35/18     (2006.01)

(52) U.S. Cl.
CPC ............. G02B 27/22 (2013.01); G02B 17/002 (2013.01); G02B 17/004 (2013.01);
(Continued)

(58) Field of Classification Search
CPC . G02B 27/22; G02B 27/2221; G02B 27/2228; G02B 27/2235; G02B 27/2242; G02B 27/225; G02B 27/24; G02B 17/002; G02B 17/004; G02B 27/2214; G02B 5/12; G02B 5/136; G02B 5/045; G02B 27/2292; G02B 5/124; G03B 35/18
(Continued)

(56) References Cited

U.S. PATENT DOCUMENTS 4,741,595 A     5/1988 Onoda et al.
4,853,769 A *   8/1989 Kollin ................ H04N 13/0418
                                            348/42
(Continued)

FOREIGN PATENT DOCUMENTS

CN     1280302 A     1/2001
EP     1 070 976 A2   1/2001
(Continued)

OTHER PUBLICATIONS

International Search Report for PCT/JP2012/051087, Mailing Date of Feb. 14, 2012.
(Continued)

*Primary Examiner* — Thomas K Pham
*Assistant Examiner* — Cara Rakowski
(74) *Attorney, Agent, or Firm* — Westerman, Hattori, Daniels & Adrian, LLP

(57) ABSTRACT

An optical imaging apparatus 10 disposing the first and the second reflective components 12, 14 abutting to or in proximity to each other when reflective surfaces 11, 13 of the first and the second reflective components 12, 14 are crossed when viewed from thereabove, the first and the second reflective components 12, 14 composed of the transparent material with a plurality of belt-shaped reflective surfaces 11, 13 vertically disposed in parallel, wherein the first and the second reflective components 12, 14 are formed with a plurality of reflectors 15-18 laminated respectively and the places of the reflective surfaces 11, 13 of each reflector 15-18 of the first and the second reflective compo-
(Continued)

nents 12, 14 are shifted in parallel. Thus, high definition three-dimensional real image is formed inexpensively in a space a plurality of observers gaze simultaneously.

4 Claims, 13 Drawing Sheets

(52) U.S. Cl.
  CPC ....... *G02B 17/006* (2013.01); *G02B 27/2292* (2013.01); *G03B 35/18* (2013.01)

(58) Field of Classification Search
  USPC .... 359/459, 471, 472, 478, 479; 353/10, 98, 353/99
  See application file for complete search history.

(56) References Cited

U.S. PATENT DOCUMENTS

| | | |
|---|---|---|
| 6,466,185 B2 | 10/2002 | Sullivan et al. |
| 7,443,583 B2 | 10/2008 | Yamauchi |
| 8,730,308 B2 | 5/2014 | Maekawa |
| 8,867,136 B2 | 10/2014 | Hashikawa |
| 2004/0191548 A1 | 9/2004 | Takemoto |
| 2004/0263976 A1 | 12/2004 | Harata et al. |
| 2008/0285127 A1 | 11/2008 | Ochi |
| 2009/0310231 A1 | 12/2009 | Maekawa |
| 2010/0002319 A1 | 1/2010 | Maekawa |
| 2010/0195055 A1 | 8/2010 | Maekawa |
| 2010/0231860 A1 | 9/2010 | Maekawa |
| 2011/0181949 A1 | 7/2011 | Hashikawa |
| 2012/0081788 A1 | 4/2012 | Maekawa et al. |
| 2012/0287125 A1 | 11/2012 | Liu |
| 2013/0082904 A1 | 4/2013 | Nakai et al. |

FOREIGN PATENT DOCUMENTS

| | | |
|---|---|---|
| EP | 2 180 365 A1 | 4/2010 |
| JP | 51-44186 A | 4/1976 |
| JP | 58-21702 A | 2/1983 |
| JP | 60-110445 A | 6/1985 |
| JP | 61-25104 A | 2/1986 |
| JP | 63-191182 A | 8/1988 |
| JP | 2-167502 A | 6/1990 |
| JP | 06-160770 A | 6/1994 |
| JP | 07-56112 A | 3/1995 |
| JP | 09-005503 A | 1/1997 |
| JP | 11-23812 A | 1/1999 |
| JP | 11-211915 A | 8/1999 |
| JP | 2004-295045 A | 10/2004 |
| JP | 2005-500578 A | 1/2005 |
| JP | 2005-59382 A | 3/2005 |
| JP | 2005-173546 A | 6/2005 |
| JP | 2007-178775 A | 7/2007 |
| JP | 2007-206427 A | 8/2007 |
| JP | 2008-102278 A | 5/2008 |
| JP | 2008-158114 A | 7/2008 |
| JP | 2009-25621 A | 2/2009 |
| JP | 2010-132532 A | 6/2010 |
| JP | 2010-170606 A | 8/2010 |
| JP | 2011-081296 A | 4/2011 |
| JP | 2011-81300 A | 4/2011 |
| JP | 2011-081309 A | 4/2011 |
| JP | 2011-090117 A | 5/2011 |
| JP | 2011-175297 A | 9/2011 |
| JP | 2012-14194 A | 1/2012 |
| JP | 4865088 B2 | 2/2012 |
| JP | 2012-128456 A | 7/2012 |
| JP | 2012-155345 A | 8/2012 |
| JP | 2013-73204 A | 4/2013 |
| JP | 2013-127625 A | 6/2013 |
| JP | 2015-90387 A | 5/2015 |
| TW | M418499 U1 | 12/2011 |
| TW | M422681 U1 | 2/2012 |
| WO | 03/017246 A1 | 2/2003 |
| WO | 2005/059627 A1 | 6/2005 |
| WO | 2007/116639 A1 | 10/2007 |
| WO | 2008041616 A1 | 4/2008 |
| WO | 2009/017134 A1 | 2/2009 |
| WO | 2009/131128 A1 | 10/2009 |
| WO | 2009/136578 A1 | 11/2009 |
| WO | 2010/131622 A1 | 11/2010 |
| WO | 2011/091660 A1 | 8/2011 |

OTHER PUBLICATIONS

Supplementary European Search Report dated May 29, 2015, issued in counterpart European Patent Application No. 12842760.6 (5 pages).
International Search Report dated Aug. 13, 2013, issued in application No. PCT/JP2013/064372 (2 pages).
International Search Report dated Dec. 10, 2013 issued in application No. PCT/JP2013/080288 (2 pages).
International Search Report dated May 21, 2013 issued in application No. PCT/JP2013/052873 (1 page).
Japanese Decision to Grant a Patent dated Aug. 21, 2012, issued in Japanese Patent Application No. 2009-242789 (3 pages).
Non-Final Office Action dated Jan. 7, 2016, issued in U.S. Appl. No. 14/405,690 (11 pages).
Notification of Reasons for Refusal dated Apr. 21, 2015, issued in Japanese patent application No. 2014-545773, with English translation (6 pages).
Notification of Reasons for Refusal dated Aug. 18, 2015, issued in Japanese Patent Application No. 2014-545773, with English translation (6 pages).
Satoshi Maekawa et al., "Advances in Passive Imaging Elements with Micromirror Array," National Institute of Information and Communications Technology, 3-5 Hikaridai, Seika-cho, Soraku-gun, Kyoto, Japan; Kobe University, 1-1 Rokkodai-cho, Nada-ku, Kobe, Japan, SPIE-IS&T vol. 6803 68030B-1 © 2008 SPIE-IS&T (12 pages).
Japanese Notification of Reasons for Refusal mailed May 15, 2012, issued in corresponding Japanese Patent Application No. 2009-242789, w/ partial English translation (6 pages).
Notice of Allowance dated Dec. 13, 2013, issued in U.S. Appl. No. 13/361,597 (20 pages).
Extended European Search Report dated Jan. 4, 2016 issued in EP application No. 13800976.6 (8 pages).
Notification of Reason for Refusal mailed Oct. 1, 2014 issued in Taiwanese Patent Application No. 102106259 (5 pages).
Non-Final Office Action dated Jan. 21, 2016, issued in U.S. Appl. No. 14/378,181 (8 pages).
European Search Report dated May 9, 2016, issued in European Patent Application No. 13854159.4 (9 pages).
Final Office Action dated May 11, 2016, issued in U.S. Appl. No. 14/378,181 (9 pages).
Chinese First Notice of Reasons for Refusal dated Jun. 3, 2016, issued in Chinese Patent Application No. 201380053517.0, w/ English translation (14 pages).
Final Office Action dated Jul. 1, 2016, issued in U.S. Appl. No. 14/405,690 (15 pages).
Japanese Notification of Reasons for Refusal dated Aug. 2, 2016, issued in Japanese Patent Application No. 2015-118473, with English translation (6 pages).
Notice of Allowance dated Aug. 12, 2016, issued in U.S. Appl. No. 14/378,181 (7 pages).
Non-Final Office Action dated Sep. 7, 2016, issued in U.S. Appl. No. 14/429,695 (35 pages).

\* cited by examiner

OPTICAL IMAGING APPARATUS

TECHNICAL FIELD

The present invention relates to an optical imaging apparatus for forming a three-dimensional real image (stereoimage) in the air.

BACKGROUND ART

Heretofore, as an apparatus which forms a stereoimage of an object easily in a space an observer gazes, an optical imaging apparatus is proposed in, for example, patent documents 1, 2, the optical imaging apparatus disposing the first and the second reflective components having a plurality of reflective surfaces disposed in parallel respectively to be overlapped abutting to or in proximity to each other so as to be in a manner that each reflection surface is orthogonal when viewed from thereabove. The optical imaging apparatus allows lights emitted from an object to be made incident from one side of the first reflective component and to reflect on an inside reflective surface, and allows the reflected lights to reflect again on a reflective surface of the second reflective component and to be emitted to outside, and to be converged at a plane-symmetric position to the object with respect to the first and the second reflective components as a center, thereby forming a stereoimage.

CITATION LIST

Patent Literature

Patent Literature 1: WO2009/131128
Patent Literature 2: Japanese Unexamined Patent Application Publication No. 2011-90117

SUMMARY OF INVENTION

Technical Problem

Reflective components (light-controlling panels) of Patent Literatures 1, 2 are two divided panels (reflective components) manufactured by being cut out from a laminated body in a manner that cut planes become perpendicular to the respective reflective surfaces, the laminated body composed by laminating a number of transparent plates each having a constant thickness and having a reflective surface on one side thereof such that the reflective surfaces are disposed at one side, the reflective surface composed of a metallic deposition film, for example, aluminum. An optical imaging apparatus is manufactured with a composite panel formed by closely attaching divided panels face-to-face, in a manner that reflective surfaces formed in one divided panel are orthogonal to reflective surfaces formed in another divided panel. Here, an interval (pitch) of the reflective surfaces is equivalent to the thickness of the transparent plate, and a width of composite panels (divided panels) is determined by a width at a time of being cut out of the laminated body.

Here, the smaller the interval (pitch) of the reflective surfaces used for the first and the second reflective components is, the better light rays with small radiation angle difference emitted from one point of the object surface or lights emitted from adjacent points of the object surface can be converged through the light-controlling panel, allowing the high-resolution (high definition) stereoimage to be formed. Thus, it is necessary that the thickness of the transparent panels forming each reflective surface be reduced as much as possible. Meanwhile, it is necessary not to change each pitch between reflective surfaces to form the stereoimage stably for a long time. Accordingly, it is desirable that the transparent plates are material which are hardly deformed mechanically and by heat (which have high rigidity and low thermal expansion coefficient) and preferable that they are formed by for instance, a quartz glass. However, when the transparent glass is manufactured by quartz glass, the thinner the thickness becomes, the more difficult the production of a plate having a large area becomes (for instance, with the plate thickness is 0.7 mm, the manufacturing of square plate with each side of about 1000 mm is possible, with the plate thickness is 0.35 mm, the manufacturing of square plate with each side of about 200 mm is the limit) and the higher manufacturing cost increases. As a result, it is likely to cause a problem that the light-controlling panel of a large area (namely, reflective component) a plurality of observers can simultaneously observe a high definition stereoimage cannot be manufactured at low costs.

The present invention has been made in view of the above, and the object thereof is to provide a low cost optical imaging apparatus that can form a high definition three-dimensional real image in a space a plurality of observers gaze simultaneously.

Solution to Problem

An optical imaging apparatus according to a first invention to accomplish the above object comprising the first and the second reflective components composed of the transparent material with belt-shaped reflective surfaces vertically disposed in parallel, the first and the second reflective components are disposed abutting to or in proximity to each other in a condition that reflective surfaces of the first and the second reflective components are crossed when viewed from thereabove,
wherein the first and the second reflective components are formed respectively by a plurality of reflectors laminated with the plurality of reflective surfaces and the place of the reflective surface of the each reflector of the first and the second reflective components is shifted in parallel.

Here, "reflective surfaces of the first and the second reflective components are crossed when viewed from thereabove" shows the status when the first and the second reflective components disposed overlapped at different heights (namely, changing heights) are projected on a plane perpendicular to respective reflective surfaces, projection parts of the reflective surfaces of the first and the second reflective components are crossed in the projection formed on the plane (the same applies hereafter).

An optical imaging apparatus according to a second invention to accomplish the above object comprising a plurality of light reflection means formed by disposing the first and the second reflective components abutting to or in proximity to each other, the first and the second reflective components are composed of the transparent material with belt-shaped reflective surfaces vertically disposed in parallel, and they are disposed in a condition that the reflective surfaces of the first and the second reflective components are crossed when viewed from thereabove,
wherein the light reflection means when viewed from thereabove are trapezoidal-shaped and the centerlines of them cross at one point, and moreover, at least one of bisectors which bisect the crossing angles between the reflective surfaces of the first and the second reflective components when viewed from thereabove coincides with the centerlines, wherein the first and the second reflective components are formed respectively by a plurality of reflectors laminated with the plurality of reflective surfaces and the place of the reflective surface of the each reflector of the first and the second reflective components is shifted in parallel.

In the optical imaging apparatus according to the first and the second invention, it is preferable that the reflective surfaces are disposed at a specified pitch on the reflector and the thickness of the reflector is in a range of 0.1 to 10 times of the pitch of the reflective surface.

In the optical imaging apparatus according to the first and the second invention, it is preferable that the first and the second reflective components are double layer structure respectively and the place of the reflective surface of the adjacent reflectors is shifted by ½ of the pitch. It is also preferable that the first and the second reflective components are S-layer structure respectively, wherein S is an integer of 3 to 10, and the place of the reflective surface of the adjacent reflectors is shifted by 1/S of the pitch.

An optical imaging apparatus according to a third invention to accomplish the above object comprising the first and the second reflective components composed of the transparent material with belt-shaped reflective surfaces vertically disposed in parallel, the first and the second reflective components are disposed abutting to or in proximity to each other in a condition that reflective surfaces of the first and the second reflective components are crossed when viewed from thereabove,
wherein the first and the second reflective components are multilayer structure with a plurality of reflectors comprising a plurality of reflective surfaces respectively, the reflective surfaces of the reflectors of odd and even numbered layers are disposed evenly aligning the place of vertical displacement respectively, and moreover, the reflective surfaces of the reflectors which are the even layers are disposed at the central position of the adjacent reflective surfaces of the reflectors which are the odd layers when viewed from thereabove.

Advantageous Effects of Invention

In the optical imaging apparatuses according to the first and the second inventions, the first and the second reflective components are formed by a plurality of reflectors laminated respectively and the place of the reflective surfaces of each reflector of the first and the second reflective components is shifted in parallel, therefore, the pitch (interval) of the reflective surfaces provided in the first and the second reflective components can be smaller than the reflective surface of each reflector forming the first and the second reflective components respectively. Such a configuration allows, for instance, light rays with small radiation angle difference emitted from one point of the object surface or lights emitted from adjacent points of the object surface to reflect respectively by the first reflective component and allows each reflection light reflected at the first reflective component to be converged by reflecting it again at the second reflective component, allowing the high definition stereoimage to be formed. Thus, the first and the second reflective components with low reflective surface pitch are composed by using the reflector with wide (namely, low resolution) reflective surface pitch. Therefore, enlargement of the first and the second reflective components can be accomplished at low costs and the optical imaging apparatus that enables a plurality of observers to observe the high definition stereoimage simultaneously can be manufactured at low costs.

In the optical imaging apparatus according to the first and the second inventions, when the reflective surface of the reflector is disposed at a specified pitch and the thickness of the reflector is in a range of 0.1 to 10 times of the pitch of the reflective surface, a ratio of the light among lights incident on the reflectors passing through the reflector reflecting only once on the reflective surface can be increased and a sharp (fine) stereoimage can be formed. Here, when the thickness of the reflector exceeds 10 times of the pitch of the reflective surface, a light reflected once on the reflective surface is reflected on a neighboring reflective surface and the light is made incident on the reflective surface where the first reflection occurred and reflected again, and it is repeated. Thus, it is difficult to obtain a sharp stereoimage. Meanwhile, when the thickness of the reflector is less than 0.1 times of the pitch of the reflective surface, the amount of light reflected on the reflective surface of the reflector is too small to obtain a sharp stereoimage.

In the optical imaging apparatus according to the first and the second inventions, when the first and the second reflective components are double layer structure and the place of the reflective surface of the adjacent reflectors is shifted by ½ of the pitch, the first and the second reflective components where reflective surfaces are arranged at the half pitch of the pitch of reflective surface of the reflector can be easily formed and a
high-resolution stereoimage can be easily obtained.

In the optical imaging apparatus according to the first and the second inventions, when the first and the second reflective components are S-layer structure respectively, wherein S is an integer of 3 to 10, and the place of the reflective surface of the adjacent reflectors is shifted by 1/S of the pitch, the first and the second reflective components where reflective surfaces are arranged at the 1/S pitch of the pitch of reflective surface of the reflector can be easily formed and a high-resolution stereoimage can be easily obtained.

In the optical imaging apparatus according to the third invention, since a light forming the stereoimage is composed of a light passing the first and the second reflective components while reflecting once on the reflective surface of the reflector of one of the first to S-th layer and a light passing the first and the second reflective components while reflecting on the reflective surface of each reflector of the first to S-th layer sequentially, a light relating to forming an image increases. Thus, a bright stereoimage can be obtained. Here, S is an optional integer number not less than 2.

In the optical imaging apparatus according to the first and the second inventions, a light may reflect once or multiple times in each reflective component. In case of multiple times reflection, a brighter stereoimage can be obtained.

DESCRIPTION OF EMBODIMENTS

Next, preferred embodiments of the present invention will now be described hereunder with reference to the accompanying drawings for the present invention to be understood.

Figure 1:
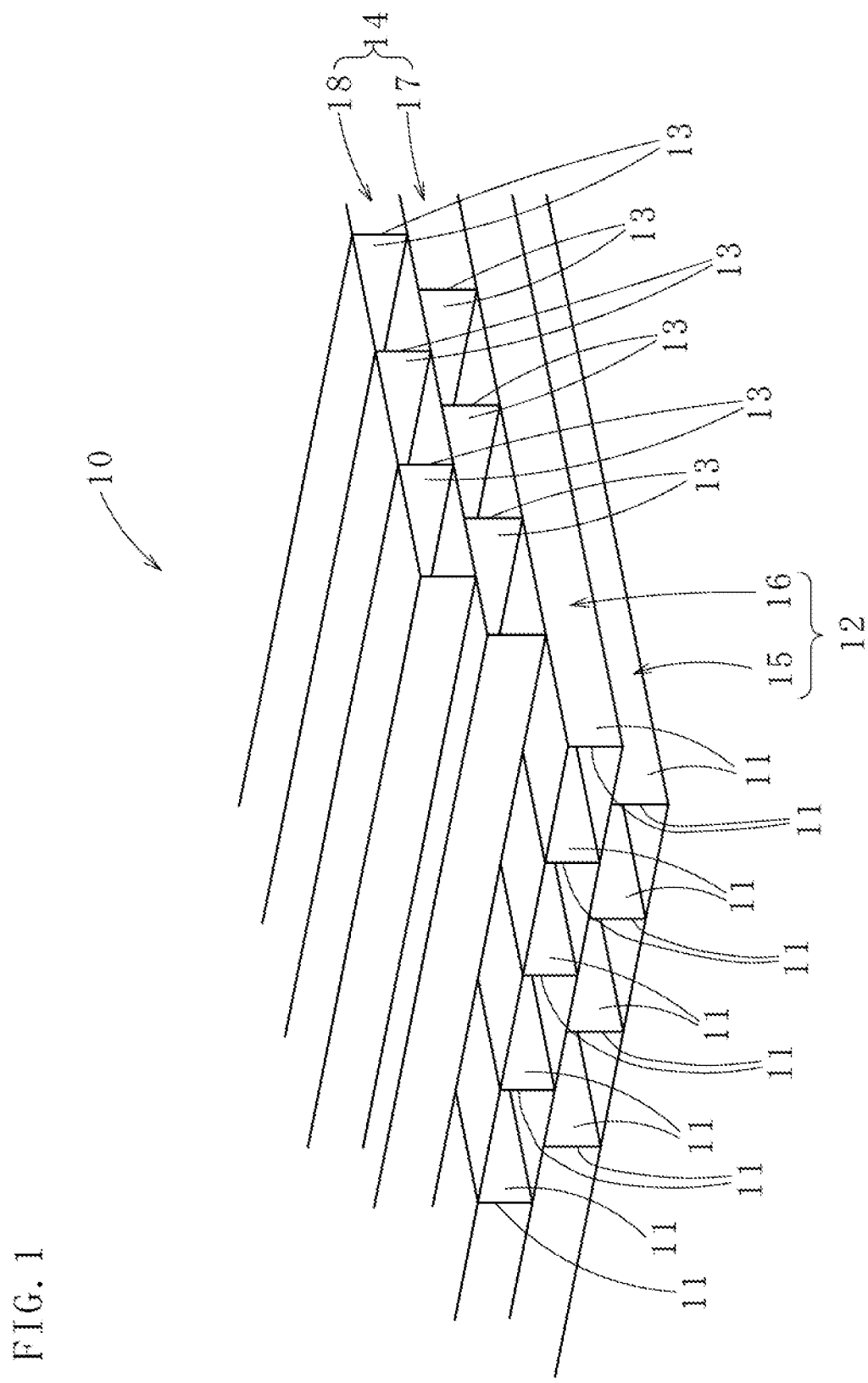
FIG. 1 is a perspective view of the optical imaging apparatus according to a first embodiment of the present invention.

As illustrated in FIG. 1, an optical imaging apparatus 10 according to a first embodiment of the present invention comprises the first reflective component 12 composed of the transparent material with a plurality of belt-shaped reflective surfaces 11 vertically disposed in parallel and the second reflective component 14 composed of a transparent material with a plurality of belt-shaped reflective surfaces 13 vertically disposed in parallel, reflective surfaces 11, 13 of the first and the second reflective components 12, 14 are crossed, for instance, orthogonal to each other when viewed from thereabove, the first and the second reflective components 12, 14 are disposed abutting to each other.

Here, the first reflective component 12 having multi-layer structure comprising laminated plural reflectors, for example, double layer structure comprising two reflectors 15, 16, reflective surfaces 11 are disposed at a specified pitch on the reflectors 15, 16, and the places of reflective surfaces 11 disposed on the reflectors 15, 16 are shifted by ½ of the pitch of the reflective surfaces 11 in parallel. Also, the second reflective component 14 having multi-layer structure comprising laminated plural reflectors, for example, double layer structure comprising two reflectors 17, 18, reflective surfaces 13 are disposed at a specified pitch on the reflectors 17, 18 (for example, the same pitch as the pitch of reflective surfaces 11), and the places of the reflective surfaces 13 disposed on the reflectors 17, 18 are shifted by ½ of the pitch of the reflective surfaces 13 in parallel. Hereunder, the present invention will be described more in detail.

Transparent material comprising the reflectors 15, 16 of the first reflective component 12 and the reflectors 17, 18 of the second reflective component 14 respectively, for instance, is glass or transparent synthetic resin. Here, preferably, glass is quartz glass and transparent synthetic resin is acrylic resin. Since quartz glass has high rigidity and low thermal expansion coefficient, when the reflectors 15-18 are composed by quartz glass, shift and interval change of the reflective surfaces 11, 13 formed respectively on the reflectors 15-18 can be prevented.

Reflective surfaces 11, 13 are metal reflective surfaces (for example, metal plating layer or metal deposition layer) and metal is, for example, aluminum or silver. When metal reflective surface is formed by aluminum, reflective surface with high reflectance can be formed inexpensively.

The first and the second reflective components 12, 14 are manufactured in the following manners: the laminated body is manufactured by laminating a plurality of transparent plates each having a constant thickness and having metallic reflective surfaces on both sides thereof respectively such that the metallic reflective surfaces are disposed mutually facing to each other. Next, reflectors 15-18 are manufactured by being cut out from the laminated body in a manner that cut planes become perpendicular to the respective metallic reflective surfaces, then the obtained reflectors 15-18 are disposed in contact with each other on different levels so that reflective surfaces 11, 13 of the reflectors 15-18 are in parallel respectively (for example, reflectors 16, 18 are disposed above the reflectors 15, 17). At the same time, the places of the reflective surfaces 11, 13 of the reflectors 16, 18 are shifted by ½ of the pitch of the reflective surfaces 11, 13 to the places of the reflective surfaces 11, 13 of the reflectors 15, 17, the reflectors 15, 16 and the reflectors 17, 18 are fixed respectively with a first binding member unillustrated. Here, the thickness of the transparent plates are equivalent to a pitch of the reflection surfaces 11, 13, and thickness (pitch) of the reflectors 15-18 are determined by the thickness at a time of being cut out of the laminated body.

The optical imaging apparatus 10 is manufactured by disposing the first reflective component 12 and the second reflective component 14 in contact with each other at different heights and fixing the first and the second reflective components 12, 14 with a second binding member unillustrated, while the reflective surface 11 of the first reflective component 12 and the reflective surface 13 of the second reflective component 14 are orthogonally crossed when viewed from thereabove. It may be also manufactured to fix the reflectors 15-18 integrally by composing a reflector fixing member that has a function of the first binding member forming the first and the second reflective components 12, 14 by fixing the reflectors 15, 16 and the reflectors 17, 18 respectively and the second binding member fixing the first and second reflective components 12, 14 mutually.

Here the thickness at a time of being cut out the reflectors 15-18 of the laminated bodies requires adjustment depending on a strength of the first and the second reflective components 12, 14 or vertical dimension and horizontal dimension of the first and the second reflective components 12, 14, for example, the thickness is in a range of 0.5 to 10 mm. Also, the widths (thickness) of the reflectors 15-18 are in the range of 0.1-10 times (preferably, in the range of 0.9-1.1 times, more preferably, the same) to the pitches of the reflective surfaces 11, 13.

Next, an effect of the optical imaging apparatus 10 according to the first embodiment of the present invention will be described.

Figure 2:
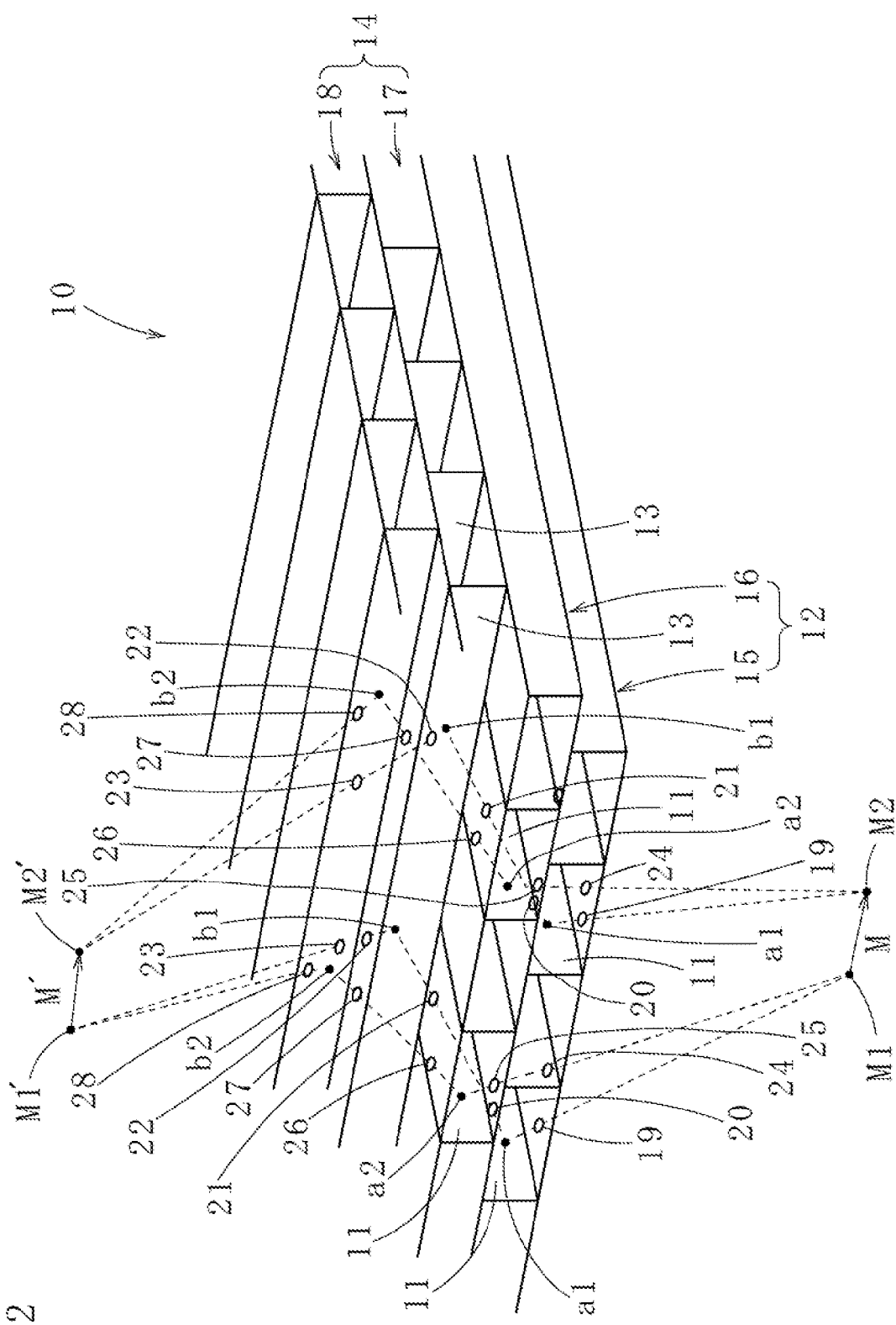
FIG. 2 is a perspective view explaining light reflection by the optical imaging apparatus.
Figure 3:
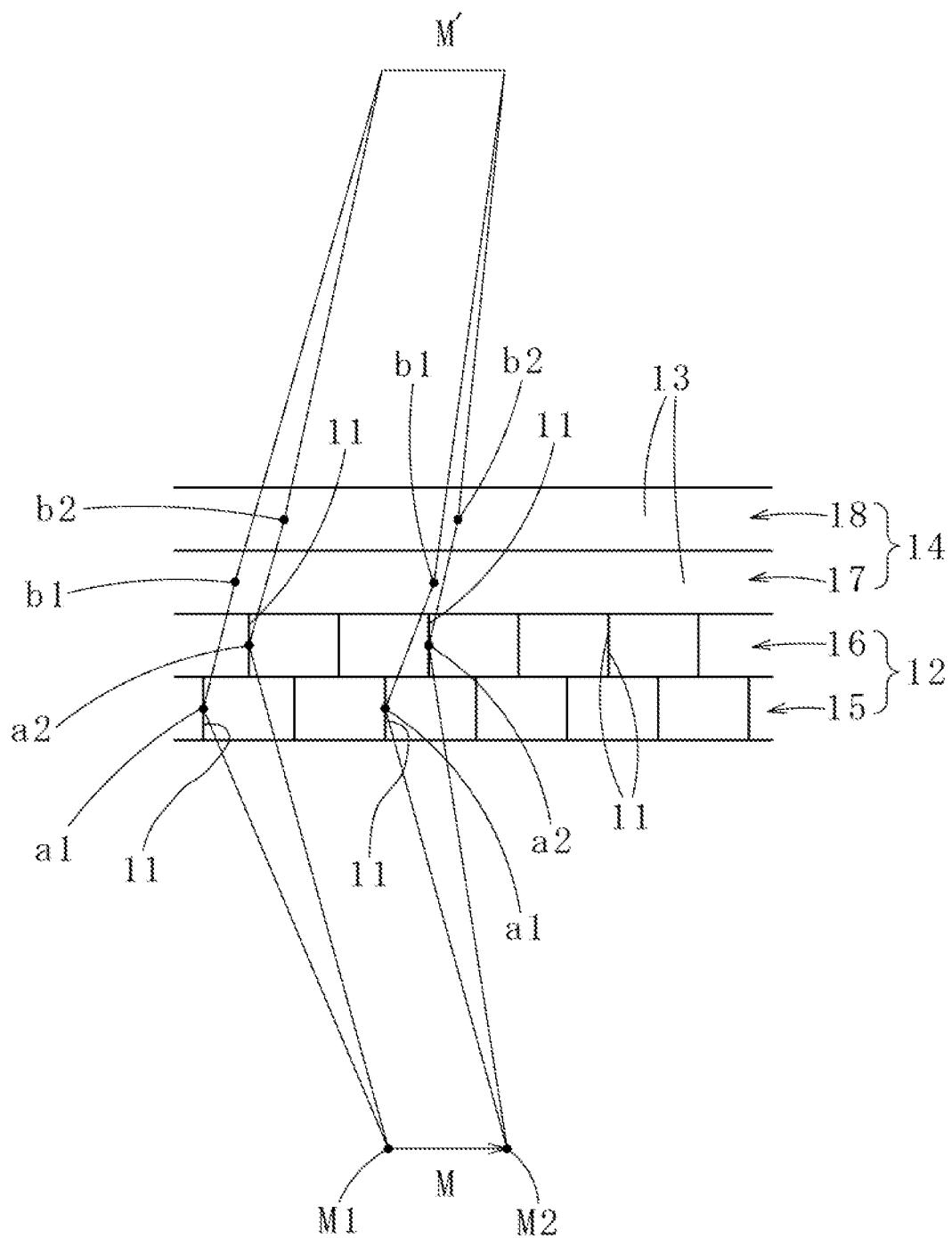
FIG. 3 is a sectional side view explaining light reflection by the optical imaging apparatus.
Figure 4:
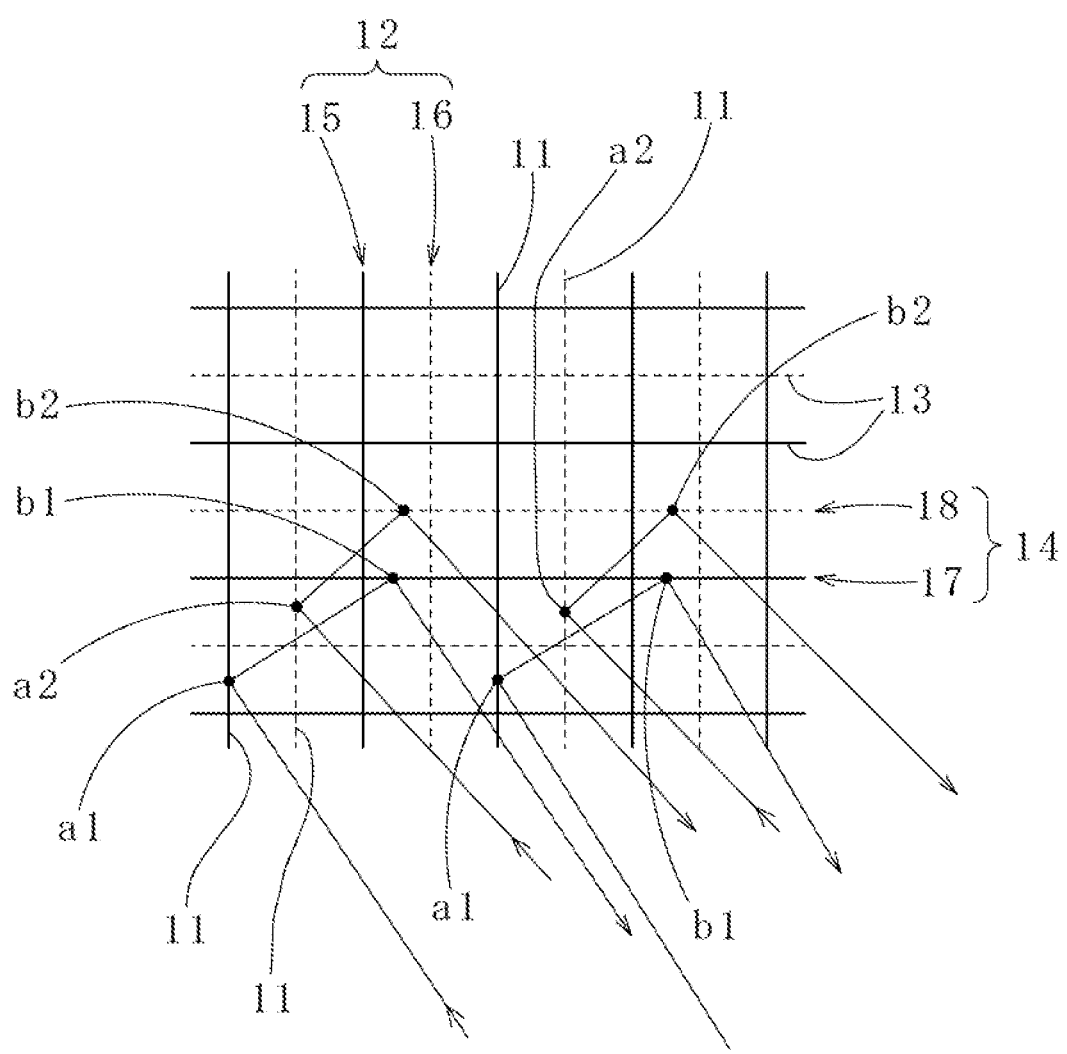
FIG. 4 is a plan view explaining light reflection by the optical imaging apparatus.

As illustrated in FIG. 2-FIG. 4, when lights emitted from different two points M1, M2 of an object M disposed with a gap from the first reflective component 12 on the one side of the first reflective component 12 (the non-abutting side of the reflector 15 with the reflector 16) of the optical imaging apparatus 10, are made incident from light entry part 19 on the one side of the first reflective component 12 (reflector 15), the incident light rays enter the reflector 15, and are reflected at point a1 of the reflective surface 11. The reflected light rays enter the reflector 16 through a light entry and exit part 20 on the other side of the reflector 15 and on the one side of the reflector 16 abutting to the reflector 15. Next, reflected lights entering the reflector 16 pass through the reflector 16 and enter the reflector 17 through a light entry and exit part 21 on the other side of the reflector 16 and on the one side of the reflector 17 abutting to the reflector 16. Then, the reflected light entering the reflector 17 reflect again at point b1 of the reflective surface 13 and enter the reflector 18 through a light entry and exit part 22 on the other side of the reflector 17 and on the one side of the reflector 18 abutting to the reflector 17. The light rays are emitted to the outside of the second reflective component 14 (reflector 18) from a light exit part 23 on the other side of the reflector 18.

When different lights emitted from different two points M1, M2 of the object M are made incident from a light entry part 24 on the one side of the first reflective component 12 (reflector 15), the light rays incident enter the reflector 15, and enters the reflector 16 through a light entry and exit part 25 on the other side of the reflector 15 and on the one side of the reflector 16 abutting to the reflector 15. Next, lights entering the reflector 16 are reflected at point a2 of the reflective surface 11 and the reflected lights enter the reflector 17 through a light entry and exit part 26 on the other side of the reflector 16 and on the one side of the reflector 17 abutting to the reflector 16. The lights pass through the reflector 17 and enter the reflector 18 through a light entry and exit part 27 on the other side of the reflector 17 and on the one side of the reflector 18 abutting to the reflector 17. Then, the reflected lights entering the reflector 18 reflect again at point b2 of the reflective surface 13 and the re-reflected light rays are emitted to the outside of the second reflective component 14 (optical imaging apparatus 10) from a light exit part 28 on the other side of the reflector 18.

Since the reflective surfaces 11, 13 are disposed orthogonally to each other when viewed from thereabove, when incident lights being incident on the first reflective component 12 reflect at the points a1 and a2 of the reflective surfaces 11 for the first time and then the reflected lights reflect at the points b1 and b2 of the reflective surface 13 of the second reflective component 14 for the second time, among the re-reflected lights emitted outside of the second reflective component 14 from light exit parts 23, 28 on the other side of reflector 18, the re-reflected light rays, i.e. the reflected light rays for the second time, become parallel to incident light rays being incident on the reflective surfaces 11 from object M when viewed from thereabove (see FIG. 4). As a result, among the lights emitted from the different points M1, M2 of the object M and being incident on the optical imaging apparatus 10, re-reflected lights having been reflected consecutively at the reflective surfaces 11, 13 once and emitted outside of the optical imaging apparatus 10 is converged at a symmetric position to the object M with respect to the optical imaging apparatus 10 (point M1', M2'), thereby forming the object image M' at a position symmetric to the object M with respect to the optical imaging apparatus 10.

Here, cases have been described as above referring to reflected lights reflected on the reflective surface 11 of the reflector 15 of the first reflective component 12 reflect again on the reflective surface 13 of the reflector 17 of the second reflective component 14 and reflected lights reflected on the reflective surface 11 of the reflector 16 of the first reflective component 12 reflect again on the reflective surface 13 of the reflector 18 of the second reflective component 14 respectively. If the reflected lights reflect on either of the reflective surfaces 11 of the reflectors 15, 16 of the first reflective component 12 for the first time and then reflect on either of the reflective surfaces 13 of the reflectors 17, 18 of the second reflective component 14 for the second time, the reflected lights can be converged at a symmetric position to the object M with respect to the optical imaging apparatus 10, thereby forming the object image M'.

Moreover, the widths of the reflectors 15-18 are less than 10 times to the pitches of reflective surfaces 11, 13, which can prevent a situation of repetition in which the reflected lights reflected on the reflective surfaces 11, 13 for the first time are reflected on the adjoining reflective surfaces 11, 13 (reflective surfaces facing to the reflective surfaces 11, 13 where the lights reflected for the first time), and the lights are made incident on the reflective surfaces 11, 13 where the lights reflected for the first time, and reflected again. By setting the widths of the reflectors 15-18 over 0.1 time of the pitch of the reflective surfaces 11, 13, the area of reflective surfaces 11, 13 of reflectors 15-18 is enlarged and the reflecting light volume is increased. Therefore, a sharp image can be formed.

Furthermore, since the place of the reflective surface 11 of each reflector 15, 16 of the first reflective component 12 is shifted by ½ of the pitch of the reflective surface 11, among the incident light rays which have small emitting angle difference emitted from the same point of the object M and being incident to the optical imaging apparatus 10, one incident light ray can reflect on the reflective surface 11 of the reflector 15 of the first reflective component 12 and another incident light ray can reflect on reflective surface 11 of reflector 16 of the first reflective component 12. The place of reflective surface 13 of each reflector 17, 18 of the second reflective component 14 is also shifted by ½ of the pitch of the reflective surface 13. For this reason, although reflection angles of reflection light reflected on reflective surface 11 of the reflector 15 and reflection light reflected on the reflective surface 11 of the reflector 16 are small, one reflection light rays can reflect on the reflective surface 13 of the reflector 17 of the second reflective component 14 and another reflection light rays can reflect on the reflective surface 13 of the reflector 18 of the second reflective component 14. As a result, the object image M' can be formed by using incident light rays entering the optical imaging apparatus 10 from the same point of the object M with the small emitting angle, which can form a high definition image.

Additionally, the reflected lights emitted outside from the second reflective component 14 do not intersect nor form an image. That is because the reflected light rays are not parallel with the incident light rays entering optical imaging apparatus 10 when viewed from thereabove. Here, the reflected light rays are the ones which are emitted from one point of the object M and enter the optical imaging apparatus 10 then are reflected on the reflective surface 11 of the reflectors 15, 16 of the first reflective component 12 once and pass the second reflective component 14 and are emitted to the outside of the second reflective component 14, namely, the optical imaging apparatus 10, or the ones which travel through the reflectors 15, 16 of the first reflective component 12 and are reflected on the reflective surface 13 of the second reflective component 14 once then are emitted to the outside of the optical imaging apparatus 10.

Figure 5:
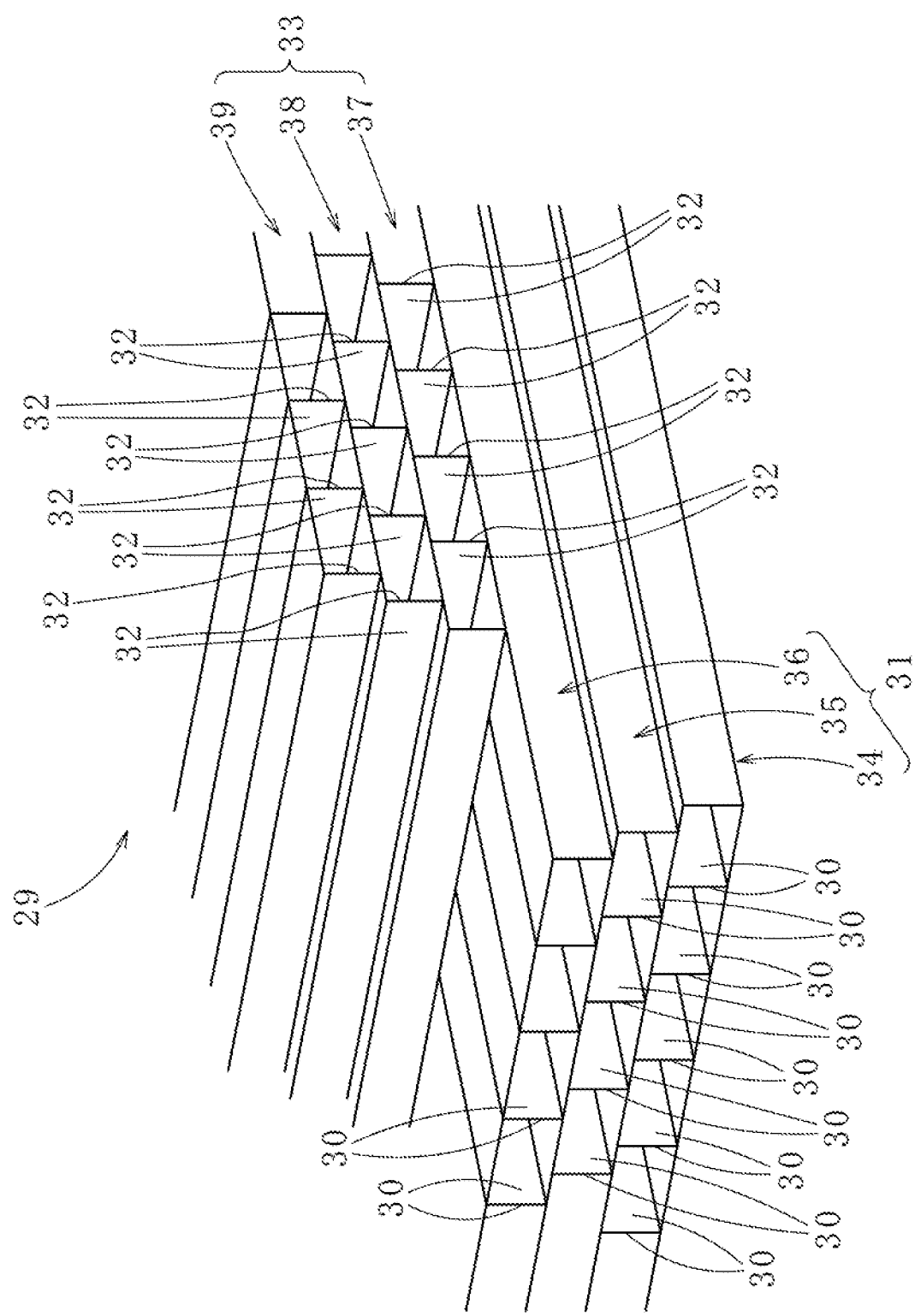
FIG. 5 is a perspective view of the optical imaging apparatus according to a second embodiment of the present invention.

As illustrated in FIG. 5, an optical imaging apparatus 29 according to a second embodiment of the present invention comprises the first reflective component 31 composed of the transparent material with a plurality of belt-shaped reflective surfaces 30 vertically disposed in parallel and the second reflective component 33 composed of a transparent material with a plurality of belt-shaped reflective surfaces 32 vertically disposed in parallel, reflective surfaces the 30, 32 of the first and the second reflective components 31, 33 are crossed, for instance, orthogonal to each other when viewed from thereabove, the first and the second reflective components 31, 33 are disposed abutting to each other.

Here, the first reflective component 31 having multi-layer structure comprising laminated plural reflectors, for example, three-layer structure comprising three reflectors 34, 35, 36, the reflective surfaces 30 are disposed at a specified pitch on the reflectors 34, 35, 36, and the places of the reflective surfaces 30 disposed on the reflectors 34, 35, 36 are shifted by ⅓ of the pitch of the reflective surfaces 30 in parallel. Also, the second reflective component 33 having multi-layer structure comprising laminated plural reflectors, for example, three-layer structure comprising three reflectors 37, 38, 39, the reflective surfaces 32 are disposed at a specified pitch on the reflectors 37, 38, 39 (for example, same pitch as the pitch of the reflective surfaces 30), and the places of the reflective surfaces 32 disposed on reflectors 37, 38, 39 are shifted by ⅓ of the pitch of the reflective surfaces 32 in parallel. Hereunder, the present invention will be described more in detail.

The same transparent material used for forming reflectors 15-18 of the optical imaging apparatus 10 of the first embodiment can be used for forming the reflectors 34-36 of the first reflective component 31 and the reflectors 37-39 of the second reflective component 33 respectively. Furthermore, the reflective surfaces 30, 32 can be metal reflective surfaces and be formed by the same material and method to form the reflective surfaces 11, 13 of the optical imaging apparatus 10. It is preferable to use quartz glass as transparent material to prevent shift or interval change of the reflective surfaces 30, 32 formed on the reflectors 34-39 respectively and use aluminum for metal reflective surface to form the reflective surfaces 30, 32 with high reflectance inexpensively.

The first and the second reflective components 31, 33 can be formed by using the reflectors 34-39 manufactured with the same manufacturing method as the reflectors 15-18 of the optical imaging apparatus 10. The first reflective component 31 is manufactured by disposing the reflectors 34-36 in contact with each other on different levels so that the reflective surfaces 30 of the reflectors 34-36 are in parallel respectively (for example, reflector 36 is disposed above the reflector 35 and the reflector 35 is disposed above the reflector 34) and shifting the places of the reflective surfaces 30 of the reflectors 34-36 adjacent vertically to each other ⅓ of the pitch of the reflective surfaces 30 to the places of the reflective surfaces 30 of the reflectors 34-36 and fixing the reflectors 34-36 with the first binding member unillustrated. Also, the second reflective component 33 is manufactured by disposing the reflectors 37-39 in contact with each other on different levels so that the reflective surfaces 32 of the reflectors 37-39 are in parallel respectively (for example, the reflector 39 is disposed above the reflector 38 and the reflector 38 is disposed above the reflector 37) and shifting the places of the reflective surfaces 32 of the reflectors 37-39 adjacent vertically to each other ⅓ of the pitch of reflective surfaces 32 to the places of the reflective surfaces 32 of the reflectors 37-39 and fixing the reflectors 37-39 with the first binding member unillustrated.

The optical imaging apparatus 29 is manufactured by disposing the first reflective component 31 and the second reflective component 33 in contact with each other at different heights and fixing the first and the second reflective components 31, 33 with a second binding member unillustrated, while the reflective surface 30 of the first reflective component 31 and the reflective surface 32 of the second reflective component 33 are orthogonally crossed when viewed from thereabove. It may be also manufactured to fix reflectors 34-39 integrally by composing a reflector fixing member that has a function of the first binding member forming the first and the second reflective components 31, 33 by fixing the reflectors 34-36 and the reflectors 37-39 respectively and the second binding member fixing the first and second reflective components 31, 33 mutually.

Here the thickness at a time of being cut out reflectors 34-39 of the laminated bodies requires adjustment depending on a strength of the first and the second reflective components 31, 33 or vertical dimension and horizontal dimension of the first and the second reflective components 31, 33, for example, the thickness is in a range of 0.5 to 10 mm. Also, the widths (thickness) of reflectors 34-39 are in the range 0.1-10 times (preferably, in the range of 1-5 times, more preferably, in the range of 2-3 times) to the pitches of reflective surfaces 30, 32.

Next, an effect of the optical imaging apparatus 29 according to the second embodiment of the present invention will be described.

Figure 6:
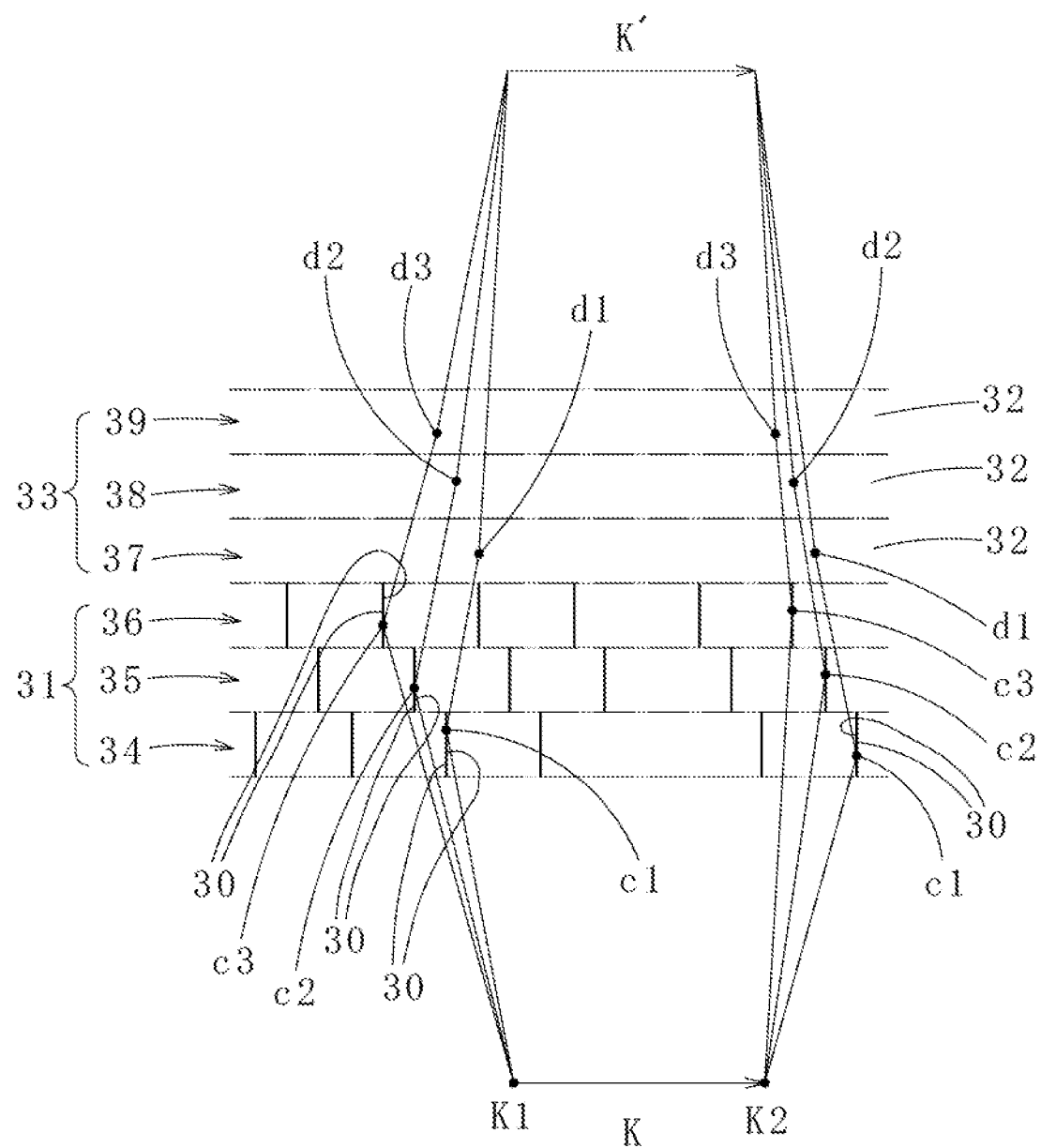
FIG. 6 is a sectional side view explaining light reflection by the optical imaging apparatus.
Figure 7:
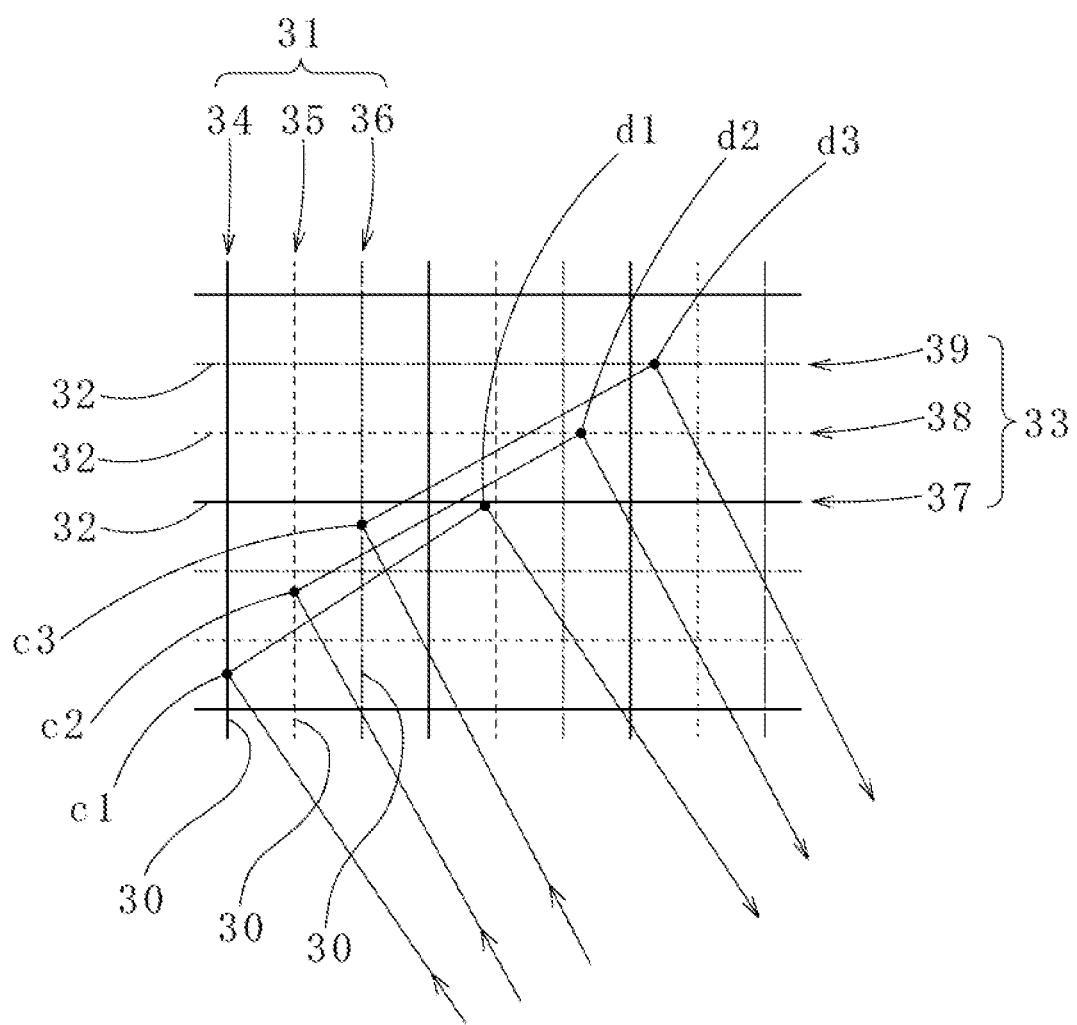
FIG. 7 is a plan view explaining light reflection by the optical imaging apparatus.

As illustrated in FIG. 6 and FIG. 7, when lights emitted from different two points K1, K2 of an object K disposed with a gap from the first reflective component 31 on the one side of the first reflective component 31 (the non-abutting side of reflector 34 with the reflector 35) of the optical imaging apparatus 29, are made incident from the one side of the first reflective component 31 (reflector 34), the incident light rays enter the reflector 34, and are reflected at point c1 of the reflective surface 30. The reflected light rays enter the reflector 35 through the one side of the reflector 35 abutting to the reflector 34 from the other side of the reflector 34. Next, reflected lights entering the reflector 35 pass through the reflector 35 and enter the reflector 36 through the one side of the reflector 36 abutting to the reflector 35 from the other side of the reflector 35 and pass through the reflector 36 and enter the reflector 37 through one side of the reflector 37 of the second reflective component 33 abutting to the reflector 36 from the other side of the reflector 36. Then, the reflected light entering the reflector 37 reflect again at point d1 of the reflective surface 32 and the re-reflected lights enter the reflector 38 through one side of the reflector 38 abutting to the reflector 37 from the other side of the reflector 37. The re-reflected light rays travel through reflector 38 and enter the reflector 39 through one side of the reflector 39 abutting to the reflector 38 from the other side of the reflector 38. The light rays traveling through the reflector 39 are emitted to the outside of the reflector 39 (the second reflective component 33), namely the optical imaging apparatus 29 from the other side of the reflector 39.

When different lights emitted from different two points K1, K2 of the object K are made incident from one side of the reflector 34 of the first reflective component 31, the light rays made incident enter the reflector 34, then enter the reflector 35 through one side of the reflector 35 abutting to the reflector 34 from the other side of the reflector 34. The light rays are reflected at point c2 of reflective the surface 30, then the reflected light rays enter the reflector 36 through one side of the reflector 36 abutting to the reflector 35 from the other side of the reflector 35. Next, the reflected light rays entering the reflector 36 travel through the reflector 36, then enter the reflector 37 through the one side of the reflector 37 of the second reflective component 33 abutting to the reflector 36. The reflected light rays entering the reflector 37 enter the reflector 38 through one side of the reflector 38 abutting to the reflector 37 from the other side of the reflector 37 and are reflected again at point d2 of the reflector 32. The re-reflected light rays enter the reflector 39 through one side of the reflector 39 abutting to the reflector 38 from the other side of the reflector 38 and travel through the reflector 39 and then are emitted from the other side of the reflector 39 to the outside of the reflector 39 (the optical imaging apparatus 29).

Furthermore, the other light rays emitted from two points K1, K2 of the object K enter the reflector 34 from one side of the reflector 34 of the first reflective component 31 and the light entering the reflector 34 travel through the reflector 34 then enter the reflector 35 through one side of the reflector 35 abutting to the reflector 34 from the other side of the reflector 34. The light rays entering the reflector 35 travel through the reflector 35 and enter the reflector 36 through one side of the reflector 36 abutting to the reflector 35 from the other side of the reflector 35. Next, the light rays entering the reflector 36 are reflected at point c3 of the reflective surface 30 and enter the reflector 37 through one side of the reflector 37 of the second reflective component 33 abutting to the reflector 36 from the other side of the reflector 36. The reflected light rays traveling through the reflector 37 enter the reflector 38 through one side of the reflector 38 abutting to the reflector 37 from the other side of the reflector 37 and travel through the reflector 38 then enter the reflector 39 through one side of the reflector 39 abutting to the reflector 38 from the other side of the reflector 38 and are reflected again at point d3 of the reflective surface 32. The re-reflected light rays traveling through the reflector 39 are emitted from the other side of the reflector 39 to the outside of the reflector 39 (the second reflective component 33), namely the optical imaging apparatus 29.

As illustrated in FIG. 7, since the reflective surfaces 30, 32 are disposed orthogonally to each other when viewed from thereabove, when incident lights being incident on the first reflective component 31 reflect at the points c1, c2 and c3 of the reflective surfaces 30 for the first time and then the reflected lights reflect at the points d1, d2 and d3 of the reflective surface 32 of the second reflective component 33 for the second time, among the re-reflected fights emitted outside of the second reflective component 33, each reflected light ray for the second time (each re-reflected light ray) becomes parallel to each incident light ray being incident on points c1, c2 and c3 of the reflective surfaces 30 from the object K when viewed from thereabove (see FIG. 7). As a result, among the lights emitted from the different points K1, K2 of the object K and falling incident on the optical imaging apparatus 29, re-reflected lights having been reflected consecutively at the reflective surfaces 30, 32 once respectively and emitted outside of the optical imaging apparatus 29 is converged at a symmetric position to the object K with respect to the optical imaging apparatus 29, thereby forming the object image K' at a position symmetric to the object K with respect to the optical imaging apparatus 29.

Here, cases have been described as above referring to reflected lights reflected on the reflective surface 30 of the reflector 34 of the first reflective component 31 reflect again on the reflective surface 32 of the reflector 37 of the second reflective component 33 and reflected lights reflected on reflective surface 30 of the reflector 35 of the first reflective component 31 reflect again on the reflective surface 32 of the reflector 38 of the second reflective component 33 and reflected lights reflected on the reflective surface 30 of the reflector 36 of the first reflective component 31 reflect again on the reflective surface 32 of the reflector 39 of the second reflective component 33 respectively. If the reflected lights reflect on either of reflective surfaces 30 of the reflector 34-36 of the first reflective component 31 for the first time and then reflect on either of the reflective surfaces 32 of the second reflective component 33 for the second time, they can be converged at a symmetric position to the object K with respect to the optical imaging apparatus 29, thereby forming the object image K'.

Moreover, the widths of the reflectors 34-39 are less than 10 times to the pitches of reflective surfaces 30, 32, which can prevent a situation of repetition in which the reflected lights reflected on the reflective surfaces 30, 32 for the first time are reflected on the adjoining reflective surfaces 30, 32 (reflective surfaces facing to the reflective surfaces 30, 32 where the lights reflected for the first time), and the lights are made incident on the reflective surfaces 30, 32 where the lights reflected for the first time, and reflected again. By setting the widths of reflectors 34-39 over 0.1 time of the pitch of the reflective surfaces 30, 32, the area of reflective surfaces 30, 32 of the reflectors 34-39 is enlarged and the reflecting light volume is increased. Therefore, a bright image can be formed.

Furthermore, since the place of the reflective surface 30 of each reflector 34-36 of the first reflective component 31 is shifted by ⅓ of the pitch of the reflective surface 30, the incident light rays which have small emitting angle difference emitted from same point of the object K and making incident to the optical imaging apparatus 29 can reflect on either one of the reflective surfaces 30 of the reflectors 34-36 of the first reflective component 31. The place of the reflective surface 32 of each reflector 37-39 of the second reflective component 33 is also shifted by ⅓ of the pitch of the reflective surface 32. For this reason, although reflection angles of reflection lights reflected on the reflectors 34-36 respectively are small, reflection light rays can reflect on either one of the reflective surfaces 32 of the reflectors 37-39 of the second reflective component 33. As a result, the object image K' can be formed by using incident light rays entering the optical imaging apparatus 29 from the same point of the object K with the small emitting angle, which can form a high definition image.

Additionally, the reflected lights emitted outside from the optical imaging apparatus 29 do not intersect nor form an image. That is because the reflected light rays are not parallel with the incident light rays entering the optical imaging apparatus 29 when viewed from thereabove. Here, the reflected light rays are the ones which are emitted from one point of the object K and enter the optical imaging apparatus 29 then are reflected on either one of the reflective surfaces 30 of the reflectors 34-36 of the first reflective component 31 once and pass the second reflective component 33 and are emitted to the outside of the optical imaging apparatus 29, or the ones which travel through the reflectors 34-36 of the first reflective component 31 and are reflected on either one of the reflective surfaces 32 of the reflectors 37-39 of the second reflective component 33 once then are emitted to the outside of the optical imaging apparatus 29.

Figure 8:
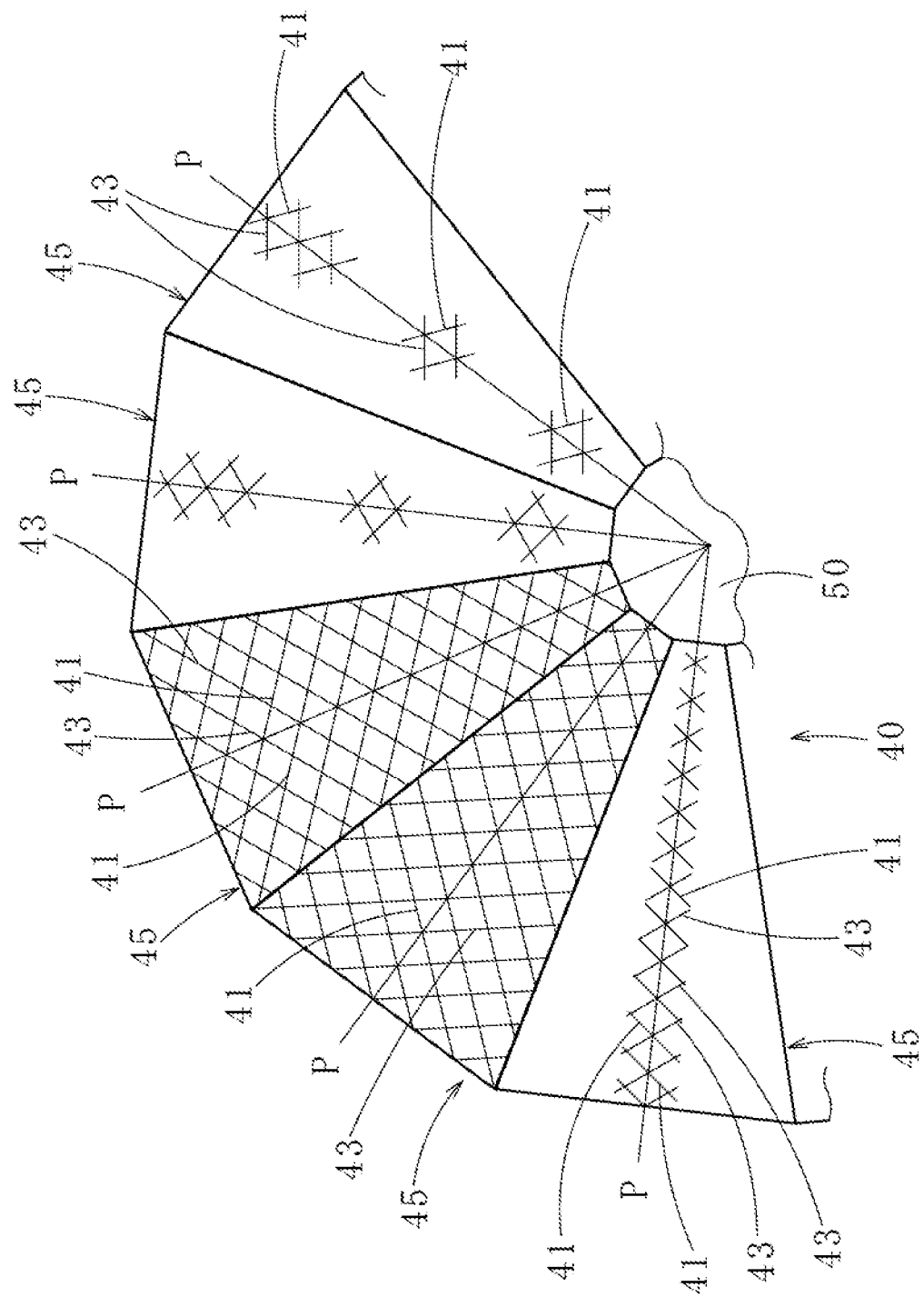
FIG. 8 is a plan view of the optical imaging apparatus according to a third embodiment of the present invention.
Figure 9:
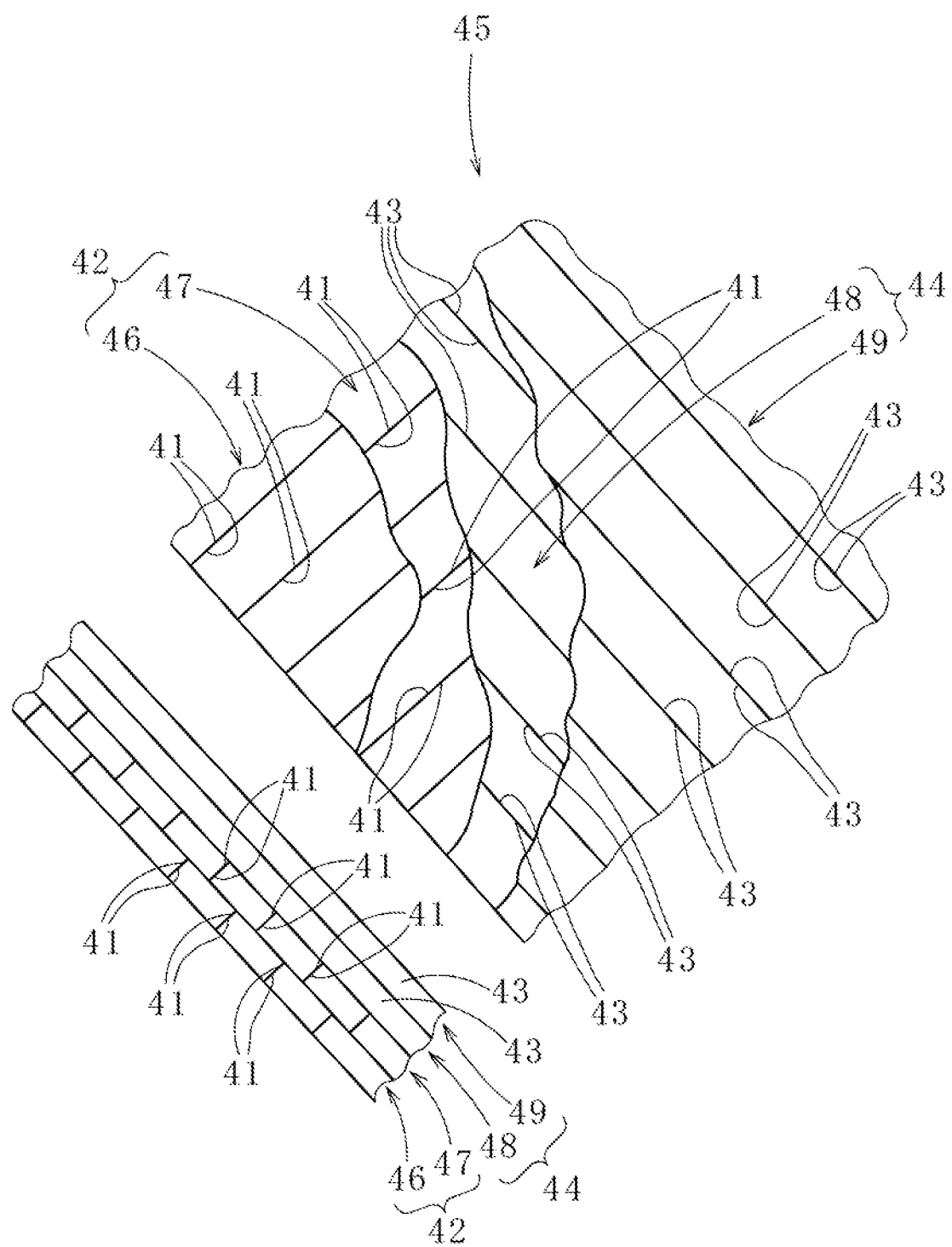
FIG. 9 is an explanatory diagram of a manufacturing method of light reflecting means of the optical imaging apparatus.

As illustrated in FIGS. 8, 9, an optical imaging apparatus 40 according to a third embodiment of the present invention comprises the first reflective component 42 composed of the transparent material with a plurality of belt-shaped reflective surfaces 41 vertically disposed in parallel and the second reflective component 44 composed of a transparent material with a plurality of belt-shaped reflective surfaces 43 vertically disposed in parallel, reflective surfaces 41, 43 of the first and the second reflective components 42, 44 are crossed, for instance, orthogonal to each other when viewed from thereabove, provided with plural (N) light reflection means 45 formed by disposing the first and the second reflective components 42, 44 in contact with each other and centerlines P of the light reflection means 45 when viewed from thereabove are crossed at one point. In FIG. 8, for a clear illustration of the reflective surfaces 41, 43, the first and the second reflective components 42, 44 and the reflective surfaces 41, 43 are illustrated over the other respectively.

As illustrated in FIG. 9, the first reflective component 42 having multi-layer structure comprising laminated plural reflectors, for example, double layer structure comprising two reflectors 46, 47, the reflective surfaces 41 are disposed at a specified pitch on the reflectors 46, 47, and the places of the reflective surfaces 41 disposed on the reflectors 46, 47 are shifted by ½ of the pitch of the reflective surfaces 41 in parallel. Also, the second reflective component 44 having multi-layer structure comprising laminated plural reflectors, for example, double layer structure comprising two reflectors 48, 49, the reflective surfaces 43 are disposed at a specified pitch on the reflectors 48, 49 (for example, same pitch as the pitch of reflective surfaces 41), and the places of the reflective surfaces 43 disposed on the reflectors 48, 49 are shifted by ½ of the pitch of the reflective surfaces 43 in parallel. Moreover, at least one of bisectors which bisect the crossing angles between the reflective surfaces 41 of the reflectors 46, 47 of the first reflective component 42 and the reflective surfaces 43 of the reflectors 48, 49 of the second reflective component 44 when viewed from thereabove coincides with the centerlines P.

In a case where the light reflection means 45 have a trapezoidal shape (an isosceles trapezoidal shape) of the same size and the light reflection means 45 are placed so that the centerlines P of light reflection means 45 intersect at one point, the optical imaging apparatus 40 forms a shape of a regular polygon with N sides when viewed from thereabove. Since the hole in the shape of a regular polygon with N sides where reflective surfaces 41, 43 are not disposed is formed in an area where the centerlines P of each of the light reflection means 45 intersect at one point as a center, a flat plate-shaped light-shielding portion 50 is inserted into the hole and the object (not illustrated) is placed at one side of the light-shielding portion 50 (below the light-shielding portion 50 in FIG. 8). The light-shielding portion 50 allows, among the light from the object, light rays that pass through the optical imaging apparatus 40 without reflecting at the reflective surfaces 41, 43 (passing lights without reflecting) to be intercepted. The light-shielding portion 50 also allows, among the light from the object, light rays that are incident on the optical imaging apparatus 40 at small incident angles and reflecting only once at either one of the reflective surfaces 41, 43 and passing through the optical imaging apparatus 40 to be effectively intercepted. Such a configuration prevents mirror images (virtual images) of the object caused by one-time reflection at either one of the reflective surfaces 41, 43 from appearing as ghost or noise disturbing the real image.

Here, the "N" is an integral number, e.g., in a range of 4 to 100. The larger the N is, the more improved a ratio of reflective surfaces 41, 43 existing on the centerlines P with respect to reflective surfaces 41, 43 comprised in the light reflection means 45. Improved ratio of the reflective surfaces 41, 43 existing on the centerlines P contributes to relative increase in a ratio of lights reflecting once at each reflective surfaces 41, 43 and passing through the optical imaging apparatus 40 (i.e., relative decrease in a ratio of lights reflecting only once at either one of reflective surfaces 41, 43 and passing through the optical imaging apparatus 40), thereby allowing the real image to be brighter while preventing the appearance of mirror images of the object.

Since the function of the optical imaging apparatus 40 according to the third embodiment of the present invention (the function of reflecting incident lights to one side of the optical imaging apparatus 40 once on each reflective surfaces 41, 43 and emitting the light rays as reflected lights from the other side of the optical imaging apparatus 40 to outside of the optical imaging apparatus 40) is the same as that of the optical imaging apparatus 10 according to the first embodiment of the present invention, description thereof will be omitted.

The light reflection means 45 of a trapezoidal shape can be manufactured, e.g., by a method described below.

First, with the same method as the manufacturing of the first and the second reflective components 12, 14 of the optical imaging apparatus 10 of the first embodiment, raw reflective components 51, 52 (raw reflective component 51 has double layer structure comprising the two reflectors 46, 47 and the raw reflective component 52 has double layer structure comprising the two reflectors 48, 49) for formation of the first and the second reflective components 42, 44 are manufactured respectively.

Figure 10:
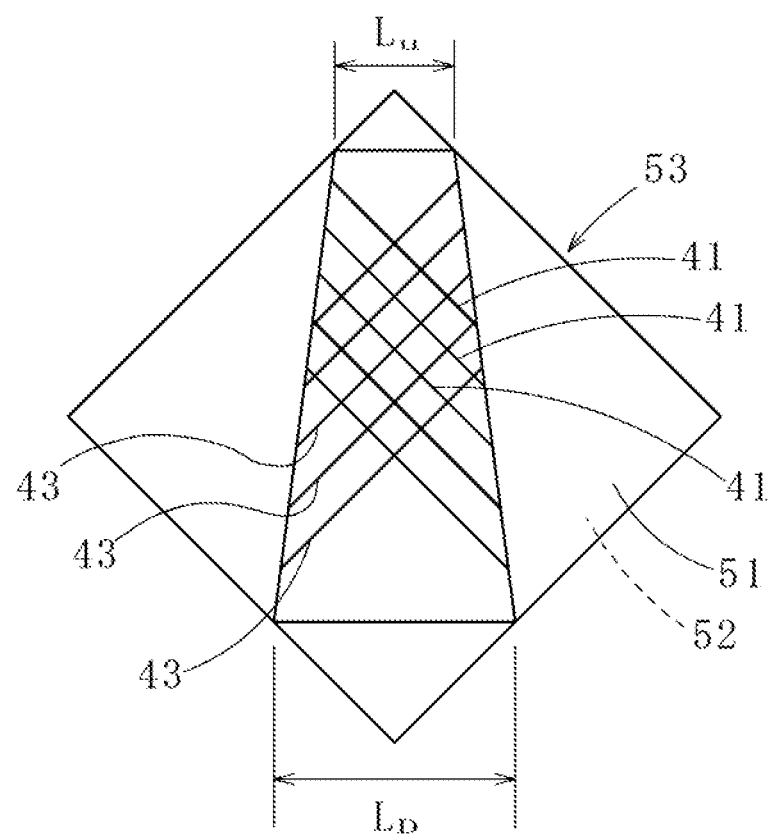
FIG. 10 is an explanatory diagram of a manufacturing method of light reflecting means of the optical imaging apparatus.

As illustrated in FIG. 10, raw reflective components 51, 52 are disposed in contact with each other at different heights, in addition, reflective surface 41 of the raw reflective component 51 and the raw reflective surface 43 of the raw reflective component 52 are orthogonally crossed when viewed from thereabove, and the raw light reflection means 53 is formed by fixing the raw reflective components 51, 52 to each other with a binding member unillustrated.

Next, as illustrated in FIG. 10, the raw light reflection means 53 is placed horizontally and is rotated around the center thereof so that directions of the respective bisectors which bisect crossing angles (90 degrees) between the reflective surface 41 of the raw reflective component 51 and the reflective surface 43 of the raw reflective component 52 in the raw light reflection means 53 when viewed from thereabove become orthogonal to the horizontal direction. Then, the light reflection means 45 is cut out of the raw light reflection means 53 in a manner that an upper base and a lower base of the trapezoid are parallel to the horizontal direction and a centerline of the trapezoid coincides with one of the bisectors. Here, an upper-base length $L_U$ is $2R_I \cdot \sin(180°/N)$ and a lower-base length $L_D$ is $2R_O \cdot \sin(180°/N)$, where $R_I$ is a radius of the circumcircle of the object when viewed from thereabove, and $R_O$ is a distance between the center and respective vertexes of the optical imaging apparatus 40 having a shape of a regular polygon with N sides when viewed from thereabove. The cut out light reflection means 45 in a trapezoidal shape are arranged as connected in a manner that the centerlines P of the respective light reflection means 45 intersect at one point, thereby forming a shape of a regular polygon with N sides having a hole, which is also in the shape of a regular polygon with N sides, at the center thereof. Into the hole in the shape of a regular polygon with N sides, a light-shielding portion 50 also having the shape of a regular polygon with N sides and composed of an opaque member is inserted, thereby producing the optical imaging apparatus 40.

Also, the light reflection means 45 in a trapezoidal shape may also be produced, e.g., as explained below.

Figure 11:
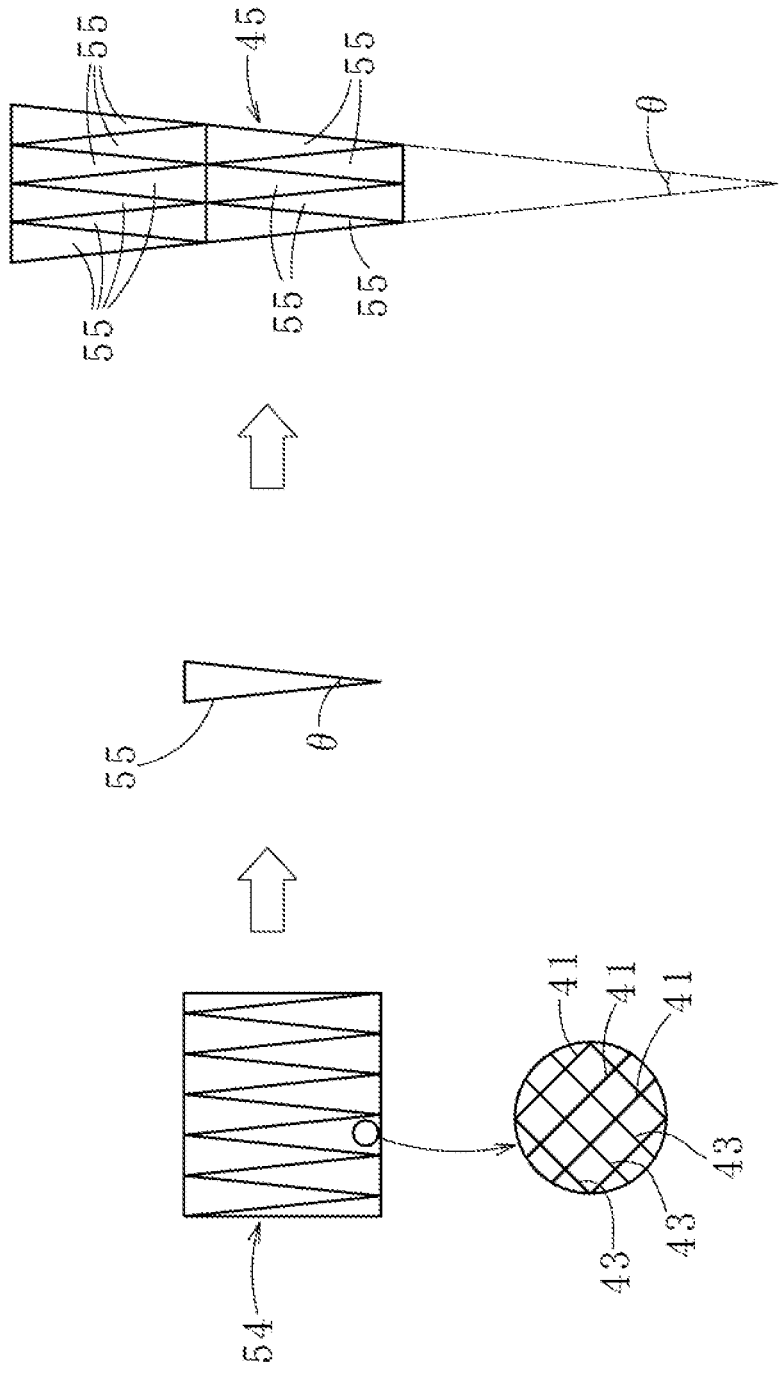
FIG. 11(A)-(C) are explanatory diagrams illustrating other manufacturing method of light reflecting means.

First, the raw light reflection means 53 is placed horizontally and is rotated around the center thereof so that directions of the respective bisectors which bisect crossing angles (90 degrees) between the reflective surface 41 of the raw reflective component 51 and the reflective surface 43 of the raw reflective component 52 in the raw light reflection means 53 when viewed from thereabove become orthogonal to the horizontal direction. Then, as illustrated in FIG. 11(A), a rectangular-shaped base member 54 is cut out from the raw light reflection means 53, e.g., in a manner that one side of a base member 54 is parallel to the bisectors which bisect the crossing angles between the reflective surfaces 41, 43 and the other side orthogonal to the one side of the base member 54 is orthogonal to the bisectors. Next, as illustrated in FIG. 11(B), isosceles triangle-shaped base member pieces 55 are cut out from the base member 54 in a manner that a height of the base member piece 55 is equivalent to a length of one side of the base member 54, and each vertex of the base member piece 55 exists on the other sides opposite to each other respectively, and a centerline of a base member piece 55 coincides with one of the bisectors which bisect the crossing angles between the reflective surfaces 41, 43. As illustrated in FIG. 11(C), the isosceles triangle-shaped base member pieces 55 are combined to form a trapezoidal shape, thereby forming the light reflection means 45. Here, when the light reflection means 45 is formed, centerlines of the respective isosceles triangle-shaped base member pieces 55 disposed at a central portion of the light reflection means 45 are linearly continuous and coincide with a centerline of the trapezoidal-shaped light reflection means 45. Moreover, all sides of the respective member pieces 55 are subjected to light-shielding treatment to prevent light from falling incident through the sides of member pieces 55 between each adjacent member piece 55.

Here, the smaller an angle θ of a vertex opposing a base side of the isosceles triangle-shaped member pieces 55 is, the larger the N becomes in the optical imaging apparatus 40 in a shape of a regular polygon with N sides formed by the combination of the light reflection means 45, which improves the ratio of the reflective surfaces 41, 43 existing on the centerlines P with respect to the reflective surfaces 41, 43 comprised in the optical imaging apparatus 40. As a result, the ratio of the light reflecting only once at the respective reflective surfaces 41, 43 and passing through the optical imaging apparatus 40 can be relatively increased, thereby allowing the real image to be brighter while preventing the appearance of the mirror image of the object.

In an optical imaging apparatus 40 according to the third embodiment of the present invention, although the light reflection means 45 consists of raw reflective components 51, 52, a raw reflective component 51 has double layer structure comprising two reflectors 46, 47 and the raw reflective component 52 has double layer structure comprising two reflectors 48, 49, the raw reflective components can be a triple layer structure comprising three reflectors. Here, when the raw reflective component is triple layer structure, reflective surfaces of each reflector are disposed at a specified pitch and the places of reflective surfaces of each reflector are disposed so as to be shifted by ⅓ of the pitch at the places of reflective surfaces of reflectors adjacent vertically. Since the function of the optical imaging apparatus using light reflection means manufactured by using raw reflective components with triple layer structure (the function of reflecting incident light to one side of the optical imaging apparatus on the reflective surfaces of either one of the reflectors in three-layer arrangement comprising the first reflective component, traveling through the first reflective component and reflecting the light rays once again on the reflective surfaces of either one of reflectors in three-layer arrangement comprising the second reflective component, traveling through the second reflective component, then emitting the light rays as reflected lights to outside of the other side of optical imaging apparatus) is the same as that of the optical imaging apparatus 29 according to the second embodiment of the present invention, description thereof will be omitted.

Figure 12:
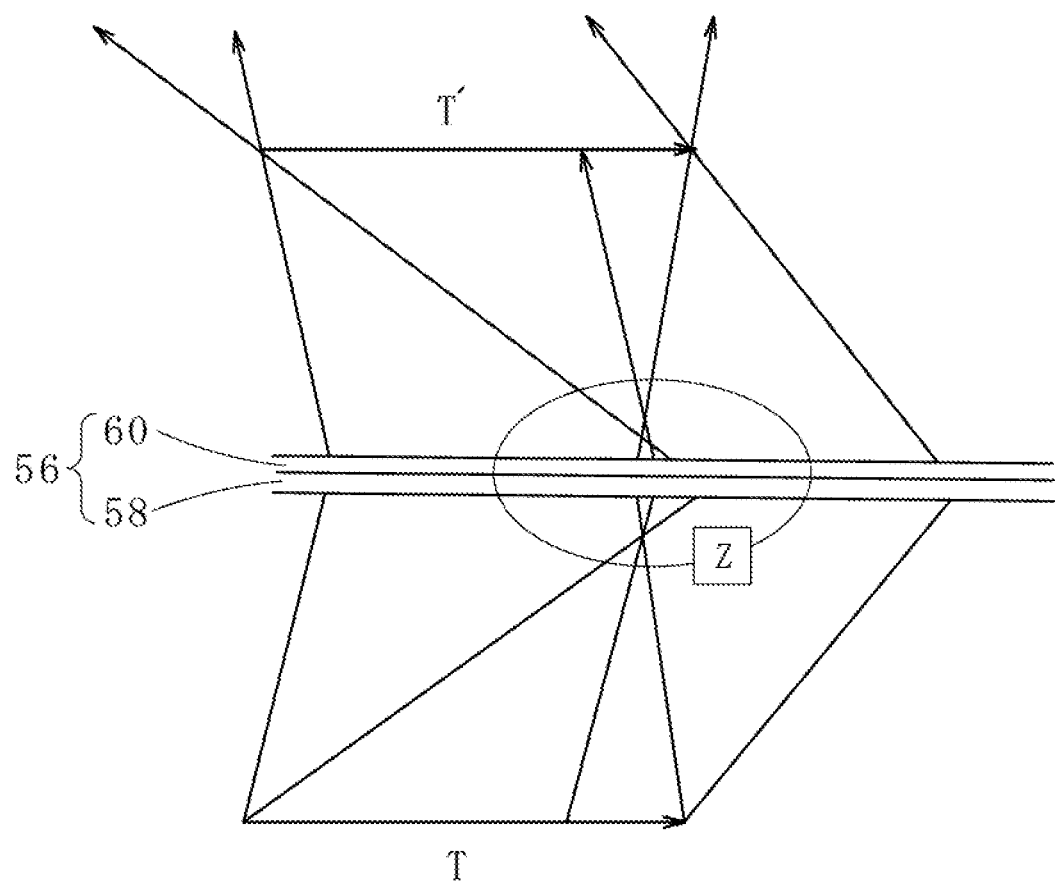
FIG. 12 is an explanatory diagram of the optical imaging apparatus according to a fourth embodiment the present invention.
Figure 13:
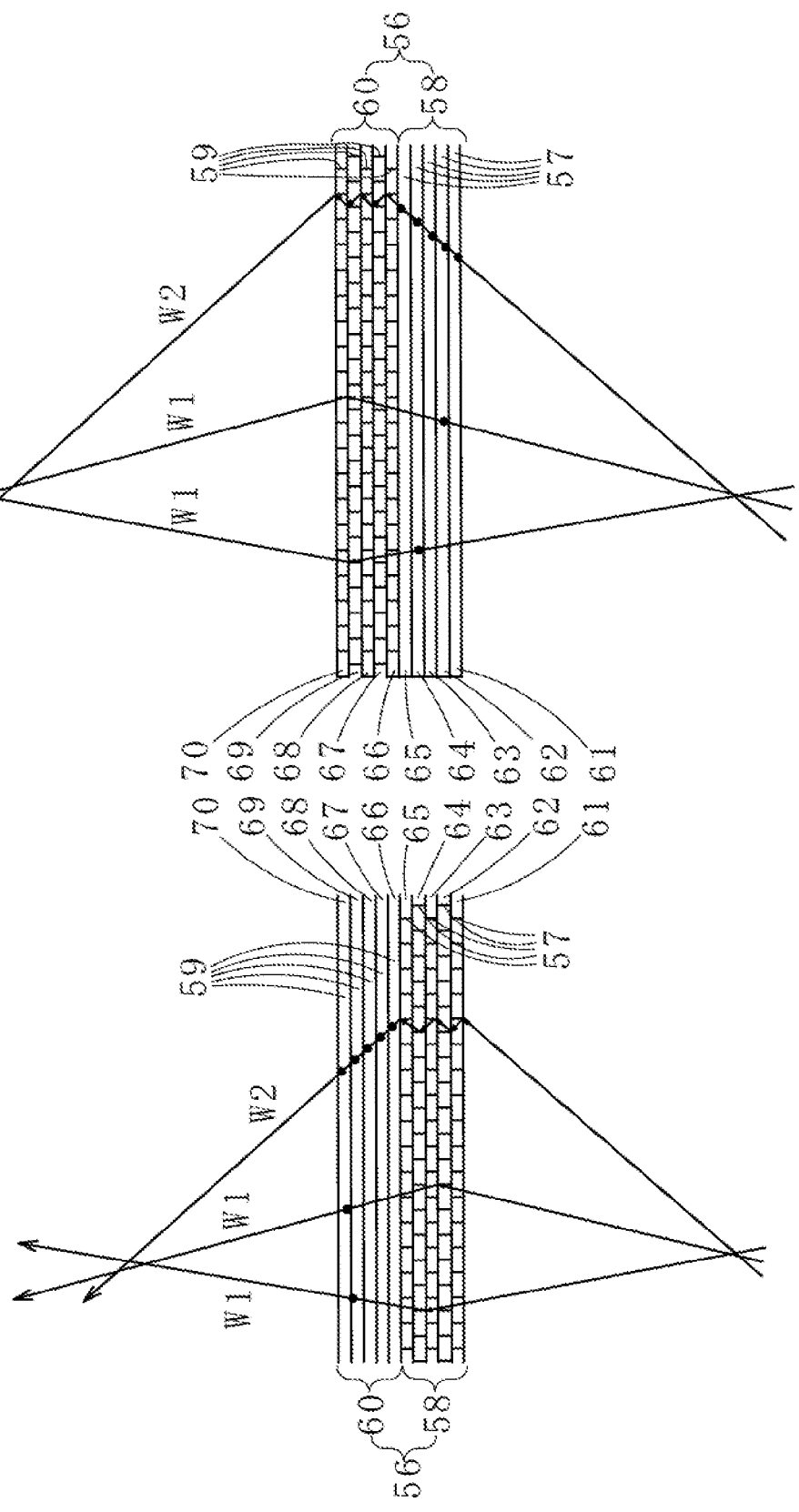
FIGS. 13(A) and (B) are explanatory diagrams illustrating a reflection situation of the light in the area Z in FIG. 12.

As illustrated in FIG. 12, an optical imaging apparatus 56 according to a fourth embodiment of the present invention comprises the first reflective component 58 composed of the transparent material with a plurality of belt-shaped reflective surfaces 57 (see FIGS. 13(A), (B)) vertically disposed in parallel and the second reflective component 60 composed of a transparent material with a plurality of belt-shaped reflective surfaces 59 (see FIGS. 13(A), (B)) vertically disposed in parallel the reflective surfaces 57, 59 of the first and the second reflective components 58, 60 are crossed, for instance, orthogonal to each other when viewed from thereabove, the first and the second reflective components 58, 60 are disposed abutting to each other.

A partially magnified image of the optical imaging apparatus 56 is shown in the FIGS. 13(A), (B). FIG. 13(B) illustrates the status that FIG. 13(A) is rotated at 90 degrees around an unillustrated central axis within the page space.

The first reflective component 58 has a five-layered structure (one example of multilayer structure) having a plurality of reflectors, for instance, five reflectors 61, 62, 63, 64 and 65 and the reflective surfaces 57 of the reflectors 61, 63, 65 which are odd numbered layers of the reflectors 61-65 are disposed aligning the place of vertical displacement evenly, namely disposed at a specified pitch and the reflective surfaces 57 of the reflectors 62, 64 which are even numbered layers of the reflectors 61-65 are disposed aligning the place of vertical displacement evenly, namely disposed at the same pitch as the reflective surfaces 57 of the reflectors 61, 63, 65 which are odd numbered layers. Then, the reflective surfaces 57 of the reflectors 62, 64 which are even layers are disposed at the central position of adjacent the reflective surfaces 57 of the reflectors 61, 63, 65 which are odd layers when viewed from thereabove. Therefore, the place of the reflective surface 57 of each reflector 61-65 (the place of the reflective surface 57 of the first reflective component 58) is shifted by ½ of the pitch of the reflective surface 57 in parallel.

The second reflective component 60 has five-layered structure (one example of multilayer structure) having a plurality of reflectors, for instance, five reflectors 66, 67, 68, 69 and 70 and the reflective surfaces 59 of the reflectors 66, 68, 70 which are odd numbered layers of the reflectors 66-70 are disposed aligning the place of vertical displacement evenly, namely disposed at a specified pitch and the reflective surfaces 59 of the reflectors 67, 69 which are even numbered layers of the reflectors 66-70 are disposed aligning the place of vertical displacement evenly, namely disposed at the same pitch as the reflective surfaces 59 of the reflectors 66, 68, 70 which are odd numbered layers. Then, the reflective surfaces 59 of the reflectors 67, 69 which are even layers are disposed at the central position of the adjacent reflective surfaces 59 of the reflectors 66, 68, 70 which are odd layers when viewed from thereabove. Therefore, the place of the reflective surface 59 of each reflector 66-70 (the place of the reflective surface 59 of the second reflective component 60) is shifted by ½ of the pitch of the reflective surface 59 in parallel.

The same transparent material used for forming the reflectors 15-18 of the optical imaging apparatus 10 of the first embodiment can be used for forming the reflectors 61-65 of the first reflective component 58 and the reflectors 66-70 of the second reflective component 60 respectively. Also, the reflective surfaces 57, 59 can be metal reflective surfaces and be formed by the same material and method to form the reflective surfaces 11, 13 of the optical imaging apparatus 10. It is preferable to use quartz glass as transparent material to prevent shift or interval change of the reflective surfaces 57, 59 formed on the reflectors 66-70 respectively and use aluminum for metal reflective surface to form the reflective surfaces 57, 59 with high reflectance inexpensively.

The first and the second reflective components 58, 60 can be formed by using the reflectors 61-70 manufactured with the same manufacturing method as the reflectors 15-18 of the optical imaging apparatus 10. The first reflective component 58 is manufactured by disposing the reflectors 61-65 in contact with each other on different levels so that the reflective surfaces 57 of the reflectors 61-65 are in parallel respectively (for example, the reflector 65 is disposed above the reflector 64 and the reflector 64 is disposed above the reflector 63 and the reflector 63 is disposed above the reflector 62 and the reflector 62 is disposed above the reflector 61) and fixing the reflectors 61-65 with the first binding member unillustrated so that the reflective surfaces 57 of the reflectors 62, 64 which are even layers are disposed at the central position of the adjacent reflective surfaces 57 of the reflectors 61, 63, 65 which are odd layers when viewed from thereabove.

Also, the second reflective component 60 is manufactured by disposing the reflectors 66-70 in contact with each other on different levels so that the reflective surfaces 59 of the reflectors 66-70 are in parallel respectively (for example, the reflector 70 is disposed above the reflector 69 and the reflector 69 is disposed above the reflector 68 and the reflector 68 is disposed above the reflector 67 and the reflector 67 is disposed above the reflector 66) and fixing the reflectors 66-70 with the first binding member unillustrated so that the reflective surfaces 59 of the reflectors 67, 69 which are even layers are disposed at the central position of the adjacent reflective surfaces 59 of the reflectors 66, 68, 70 which are odd layers when viewed from thereabove.

The optical imaging apparatus 56 is manufactured by disposing the first reflective component 58 and the second reflective component 60 in contact with each other at different heights and by fixing the first and the second reflective components 58, 60 with a second binding member unillustrated, while the reflective surface 57 of the first reflective component 58 and the reflective surface 59 of the second reflective component 60 are orthogonally crossed when viewed from thereabove. It may be also manufactured to fix reflectors 61-70 integrally by composing a reflector fixing member that has a function of the first binding member forming the first and the second reflective components 58, 60 by fixing the reflectors 61-65 and the reflectors 66-70 respectively and the second binding member fixing the first and second reflective components 58, 60 mutually.

Here the thickness at a time of being cut out the reflectors 61-70 of the laminated bodies requires adjustment depending on a strength of the first and the second reflective components 58, 60 or vertical dimension and horizontal dimension of the first and the second reflective components 58, 60, for example, the thickness is in a range of 0.5 to 10 mm. Also, the widths (thickness) of the reflectors 61-70 are in the range of 0.1-10 times (preferably, in the range of 1-5 times, more preferably, in the range of 2-3 times) to the pitches of the reflective surfaces 57, 59.

Next, an effect of an optical imaging apparatus 56 according to a fourth embodiment of the present invention will be described.

As illustrated in FIG. 12, when an object T is disposed with a distance with the first reflective component 58 on one side of the first reflective component 58 of the optical imaging apparatus 56 (the non-abutting side of a reflector 61 with a reflector 62), light rays forming the object image (stereoimage) T' at a place being plane symmetrical to the object T with the optical imaging apparatus 56 as a center, as illustrated in FIGS. 13(A), (B), are composed of a light rays taking an optical path W1 reflecting once on the reflective surfaces 57 of either one of the reflectors 61-65 of the first reflective component 58 of the optical imaging apparatus 56 and passing through the first reflective component 58 and reflecting once on the reflective surfaces 59 of either one of the reflectors 66-70 of the second reflective component 60 and passing through the second reflective component 60 and light rays taking an optical path W2 passing through the first reflective component 58 while reflecting sequentially on the reflective surfaces 57 of each reflector 61-65 of the first to fifth layer of the first reflective component 58 and passing through the second reflective component 60 while reflecting sequentially on reflective surfaces 59 of each reflector 66-70 of the first to fifth layer of the second reflective component 60.

Here, it is preferable to set a distance between the object T and the first reflective component 58 to over 50 times of the thickness of the first reflective component 58, for example. In FIG. 12, in order to show a status qualitatively the status that light rays emitted from the object T form an image through the optical imaging apparatus 56, a distance between the object T and the first reflective component 58 is showed smaller than it actually is and, at the same time, light reflection status in the optical imaging apparatus 56 is omitted.

As one example of light incidence and reflection in the area Z of FIG. 12, an optical path W1 is shown in FIGS. 13(A), (B): The lights being incident from one side of the first reflective component 58 (reflector 61), passing reflectors 61-63 of the first to third layers sequentially, entering a reflector 64 through one side of the reflector 64 of the fourth layer, reflecting on a reflective surface 57, entering a reflector 65 through one side of the reflector 65 of the fifth layer, emitting from the other side of the reflector 65 (the other side of the first reflective component 58), entering a reflector 66 through one side of the reflector 66 of the second reflective component 60 abutting to the reflector 65, passing reflectors 66-68 of the first to the third layers sequentially, entering a reflector 69 through one side of the reflector 69 of the fourth layer, reflecting on a reflective surface 59, entering a reflector 70 through one side of the reflector 70 of the fifth layer, emitting from the other side of the reflector 70 (the other side of the second reflective component 60) to the outside of reflector 70, namely, to the outside of the optical imaging apparatus 56.

Also, FIGS. 13(A), (B) show an optical path W1: lights being incident from one side of the first reflective component 58, passing the reflector 61 of the first layer, entering the reflector 62 through one side of the reflector 62 of the second layer, reflecting on the reflective surface 57, entering the reflector 63 of the third layer through the other side of the reflector 62, passing the reflector 63, 64 of the third and the fourth layers sequentially, entering reflector 65 through one side of reflector 65 of the fifth layer, emitting from the other side of the reflector 65 (the other side of the first reflective component 58), being incident from one side of the second reflective component 60 abutting to reflector 65, passing reflectors 66-69 of the first to the fourth layers sequentially, entering the reflector 70 through one side of the reflector 70 of the fifth layer, reflecting on the reflective surface 59, emitting from the other side of the reflector 70 (the other side of the second reflective component 60) to the outside of the reflector 70, namely, to the outside of the optical imaging apparatus 56.

Furthermore, FIGS. 13(A), (B) show an optical path W2: lights being incident from one side of the first reflective component 58 (reflector 61), reflecting on the reflective surfaces 57 of each reflector 61-65 of the first to fifth layers sequentially, emitting from the other side (the other side of the first reflective component 58) of the reflector 65, entering the reflector 66 (the second reflective component 60) through one side of the reflector 66 of the second reflective component 60 abutting to the reflector 65, reflecting on the reflective surfaces 59 of each reflector 66-70 of the first to fifth layers of the second reflective component 60 sequentially, emitting from the other side of the reflector 70 (the other side of the second reflective component 60) to the outside of the reflector 70, namely, to the outside of the optical imaging apparatus 56.

Here, the widths of the reflectors 61-70 are less than 10 times to the pitches of the reflective surfaces 57, 59, which can prevent a situation of repetition in which the reflected lights reflected on the reflective surfaces 57, 59 for the first time are reflected on the adjoining reflective surfaces 57, 59 (reflective surfaces facing to the reflective surfaces 57, 59 where the lights reflected for the first time), and the lights are made incident on the reflective surfaces 57, 59 where the lights reflected for the first time, and reflected again. By setting the widths of the reflectors 61-70 over 0.1 times of the pitch of the reflective surfaces 57, 59, the area of the reflective surfaces 57, 59 of the reflectors 61-70 is enlarged and the reflecting light volume is increased. Moreover, light rays forming an object image T' of the object T are composed of the light rays that take the optical path W1 reflecting once on the reflective surfaces 57 of either one of the reflectors 61-65 of the first reflective component 58 and reflecting once on the reflective surfaces 59 of either one of the reflectors 66-70 of the second reflective component 60 and passing through the optical imaging apparatus 56, and the light rays that take the optical path W2 reflecting on the reflective surfaces 57, 59 of each reflector 61-65, 66-70 of the first to fifth layers of the first and the second reflective components 58, 60 respectively and sequentially and passing through the optical imaging apparatus 56. Thus, a bright object image T' can be obtained.

Furthermore, since the place of the reflective surface 57 of each reflector 61-65 of the first reflective component 58 is shifted by ½ of the pitch of the reflective surface 57 in parallel, the incident light rays which have small emitting angle difference emitted from the same point of the object T and enter into the optical imaging apparatus 56 can reflect on either one of the reflective surfaces 57 of the reflectors 61-65 of the first reflective component 58. Also, the place of the reflective surface 59 of each reflector 66-70 of the second reflective component 60 is shifted by ½ of the pitch of the reflective surface 59. For this reason, although reflection angles of reflection lights reflected on the reflectors 61-65 of the first reflective component 58 respectively are small, the reflection light rays can reflect on either one of the reflective surfaces 59 of the reflectors 66-70 of the second reflective component 60. As a result, the object image T' can be formed by using incident light rays entering the optical imaging apparatus 56 from the same point of the object T with the small emitting angle, which can form a high definition image.

While the present invention has been described as above referring to the preferred embodiments, the present invention is not limited to the configurations described in the embodiments, and various embodiments and modifications can be made without departing from the spirit and the scope of the claims of the present invention. Moreover, the invention includes combination of the embodiments and components included in other embodiments or modifications respectively.

For example, in the optical imaging apparatuses according to the first to the third embodiments, although the first and the second reflective components were disposed abutting to each other, they can be disposed adjacently (for example, setting constant intervals equivalent to 0.1-2 times of the widths of the first and the second reflective components).

Also, in the optical imaging apparatus according to the second embodiment, although the first and the second reflective components were triple layer structure, they can be S layers (S=4 to 10). In this case, the places of the reflective surfaces of the adjacent reflectors are shifted by 1/S of the pitch.

REFERENCE SIGNS LIST

10: optical imaging apparatus, 11: reflective surface, 12: first reflective component, 13: reflective surface, 14: second reflective component, 15, 16, 17, 18: reflector, 19: light entry part, 20, 21, 22: light entry and exit part, 23: light exit part, 24: light entry part, 25, 26, 27: light entry and exit part, 28: light exit part, 29: optical imaging apparatus, 30: reflective surface, 31: first reflective component, 32: reflective surface, 33: second reflective component, 34, 35, 36, 37, 38, 39: reflector, 40: optical imaging apparatus, 41: reflective surface, 42: first reflective component, 43: reflective surface, 44: second reflective component, 45: light reflection means, 46, 47, 48, 49: reflector, 50: light-shielding portion, 51, 52: raw reflective component, 53: raw light reflection means, 54: base member, 55: base member piece, 56: optical imaging apparatus, 57: reflective surface, 58: first reflective component, 59: reflective surface, 60: second reflective component, 61, 62, 63, 64, 65, 66, 67, 68, 69, 70: reflector

The invention claimed is:
1. An optical imaging apparatus, comprising:
a first reflective component and a second reflective component disposed abutting to each other, wherein
the first reflective component includes two layers of plate-shaped reflectors composed of a transparent material, each of the two layers of plate-shaped reflectors of the first reflective component having belt shaped reflective surfaces that are vertically disposed in parallel at a first specified pitch, the belt-shaped reflective surfaces of each one of the plate-shaped reflectors in the two layers being shifted by ½ of the first specified pitch with respect to the reflective surfaces of the other one of the plate-shaped reflectors of the first reflective component,
the second reflective component includes two layers of plate-shaped reflectors composed of a transparent material, each of the two layers of plate-shaped reflectors of the second reflective component having belt shaped reflective surfaces that are vertically disposed in parallel at a second specified pitch, the belt-shaped reflective surfaces of each one of the plate-shaped reflectors in the two layers being shifted by ½ of the second specified pitch with respect to the reflective surfaces of the other one of the plate-shaped reflectors of the second reflective component, and all of the reflective surfaces of the first reflective component and all of the reflective surfaces of the second reflective component are orthogonal to one another in a plan view.

2. The optical imaging apparatus according to claim 1, wherein a thickness of each of the two layers of plate-shaped reflectors of the first reflective component is in a range of 0.1 to 10 times of the first specified pitch, and a thickness of each of the two layers of plate-shaped reflectors of the second reflective component is in a range of 0.1 to 10 times of the second specified pitch.

3. An optical imaging apparatus, comprising:

a first reflective component and a second reflective component disposed abutting to each other, wherein the first reflective component includes three layers of plate-shaped reflectors composed of a transparent material, each of the three layers of plate-shaped reflectors of the first reflective component having belt shaped reflective surfaces that are vertically disposed in parallel at a first specified pitch, the belt-shaped reflective surfaces of each one of the plate-shaped reflectors in the three layers being shifted by ⅓ of the first specified pitch with respect to the reflective surfaces of the other two of the plate-shaped reflectors of the first reflective component, the second reflective component includes three layers of plate-shaped reflectors composed of a transparent material, each of the three layers of plate-shaped reflectors of the second reflective component having belt shaped reflective surfaces that are vertically disposed in parallel at a second specified pitch, the belt-shaped reflective surfaces of each one of the plate-shaped reflectors in the three layers being shifted by ⅓ of the second specified pitch with respect to the reflective surfaces of the other two of the plate-shaped reflectors of the first reflective component, and all of the reflective surfaces of the first reflective component and all of the reflective surfaces of the second reflective component are orthogonal to one another in a plan view.

4. The optical imaging apparatus according to claim 3, wherein a thickness of each of the three layers of plate-shaped reflectors of the first reflective component is in a range of 0.1 to 10 times of the first specified pitch, and a thickness of each of the three layers of plate-shaped reflectors of the second reflective component is in a range of 0.1 to 10 times of the second specified pitch.

* * * * *